(12) United States Patent
Choi et al.

(10) Patent No.: US 10,396,978 B2
(45) Date of Patent: Aug. 27, 2019

(54) CRYPTO DEVICES, STORAGE DEVICES HAVING THE SAME, AND ENCRYPTION AND DECRYPTION METHODS THEREOF

(71) Applicant: Samsung Electronics Co., Ltd., Suwon-si, Gyeonggi-do (KR)

(72) Inventors: Hong-Mook Choi, Bucheon-si (KR); Heonsoo Lee, Hwaseong-si (KR); Sang-Hyun Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 376 days.

(21) Appl. No.: 15/227,499

(22) Filed: Aug. 3, 2016

(65) Prior Publication Data
US 2017/0054550 A1    Feb. 23, 2017

(30) Foreign Application Priority Data

Aug. 20, 2015  (KR) .................. 10-2015-0117323

(51) Int. Cl.
  *H04L 9/06*  (2006.01)
  *G06F 21/60*  (2013.01)
(52) U.S. Cl.
  CPC .......... *H04L 9/0637* (2013.01); *G06F 21/602* (2013.01); *H04L 2209/12* (2013.01); *H04L 2209/34* (2013.01)
(58) Field of Classification Search
  CPC .... G06F 21/602; G06F 21/6245; G06F 21/72; G06F 21/76; H04L 9/06637; H04L 9/0631; H04L 9/06
  See application file for complete search history.

(56) References Cited

U.S. PATENT DOCUMENTS

| 7,023,996 B2* | 4/2006 | Stephenson ........ H04B 7/18504 380/269 |
| 7,679,133 B2 | 3/2010 | Son et al. |
| 8,085,933 B2 | 12/2011 | Ferguson |
| 8,189,770 B2 | 5/2012 | Minematsu |
| 8,494,155 B1 | 7/2013 | Poo et al. |

(Continued)

FOREIGN PATENT DOCUMENTS

KR    2016-0046368 A    4/2016

OTHER PUBLICATIONS

Matthew V. Ball et al., "The XTS-AES Tweakable Block Cipher", IEEE Std 1619-2007, Apr. 18, 2008.

*Primary Examiner* — Khalil Naghdali
*Assistant Examiner* — Shaqueal D Wade
(74) *Attorney, Agent, or Firm* — Harness, Dickey & Pierce, P.L.C.

(57) ABSTRACT

A method for encryption, decryption, or encryption and decryption of data in a crypto device having at least one crypto core may include: generating a tweak value corresponding to block data, which is placed at a random position from which the encryption, decryption, or encryption and decryption starts, from among sequential block data; and/or performing the encryption, decryption, or encryption and decryption from the block data using the tweak value. A method for encryption, decryption, or encryption and decryption of block data may include: generating a tweak value corresponding to the block data at a random position; and/or performing the encryption, decryption, or encryption and decryption of the block data using the tweak value.

17 Claims, 20 Drawing Sheets

(56) References Cited

U.S. PATENT DOCUMENTS

| | | |
|---|---|---|
| 8,526,602 B2 | 9/2013 | Minematsu |
| 8,526,605 B2 * | 9/2013 | Matthews, Jr. ..... G06F 12/1408 |
| | | 380/277 |
| 8,553,466 B2 | 10/2013 | Han et al. |
| 8,559,235 B2 | 10/2013 | Yoon et al. |
| 8,654,587 B2 | 2/2014 | Yoon et al. |
| 8,666,064 B2 | 3/2014 | Choi et al. |
| 8,687,802 B2 | 4/2014 | Morris et al. |
| 8,908,859 B2 | 12/2014 | Fujisaki |
| 8,942,374 B2 | 1/2015 | Fujisaki |
| 9,002,002 B1 | 4/2015 | Poo et al. |
| 9,571,270 B2 * | 2/2017 | Shrimpton ............ H04L 9/0618 |
| 2011/0150225 A1 | 6/2011 | Minematsu |
| 2011/0233648 A1 | 9/2011 | Seol et al. |
| 2011/0255689 A1 | 10/2011 | Bolotov et al. |
| 2011/0311048 A1 * | 12/2011 | Nagata .................. H04L 9/0637 |
| | | 380/252 |
| 2014/0143553 A1 | 5/2014 | Chang |
| 2014/0208109 A1 | 7/2014 | Narendra Trivedi et al. |
| 2016/0112188 A1 | 4/2016 | Choi et al. |

\* cited by examiner

CRYPTO DEVICES, STORAGE DEVICES HAVING THE SAME, AND ENCRYPTION AND DECRYPTION METHODS THEREOF

CROSS-REFERENCE TO RELATED APPLICATION(S)

This application claims priority from Korean Patent Application No. 10-2015-0117323 filed on Aug. 20, 2015, in the Korean Intellectual Property Office (KIPO), the entire contents of which are incorporated herein by reference.

BACKGROUND

1. Field

At least one example embodiment of the inventive concepts may relate to crypto devices. At least one example embodiment of the inventive concepts may relate to storage devices including crypto devices. At least one example embodiment of the inventive concepts may relate to encryption/decryption methods.

2. Description of Related Art

A data encryption standard (DES) may refer to a block encryption protocol which is applied with a standard in an American National Standards Institute (ANSI) participated in by various countries. The block encryption protocol may include 3-DES, advanced encryption standard (AES), or the like. A variety of operating modes (e.g., an electronic codebook (ECB), a cipher block chaining (CBC), an output feedback (OFB), a cipher feedback (CFB), a XOR-encrypt-XOR (XEX), and an XEX encryption mode with tweak and cipher text stealing (XTS)) may be defined in the block encryption protocol. In a data network, an encryption device may use a block cipher and/or various operating modes, in which encryption may be performed using the block cipher to secure data.

SUMMARY

Some example embodiments of the inventive concepts may provide new crypto devices.

Some example embodiments of the inventive concepts may provide storage devices having new crypto devices.

Some example embodiments of the inventive concepts may provide encryption methods of new crypto devices.

Some example embodiments of the inventive concepts may provide decryption methods of new crypto devices.

In some example embodiments, a method for encryption, decryption, or encryption and decryption of data in a crypto device having at least one crypto core may comprise: generating a tweak value corresponding to block data, which is placed at a random position from which the encryption, decryption, or encryption and decryption starts, from among sequential block data; and/or performing the encryption, decryption, or encryption and decryption from the block data using the tweak value.

In some example embodiments, the generating of the tweak value may comprise: performing a multiplication operation in which a primitive element is multiplied by an encrypted initial tweak value.

In some example embodiments, the method may further comprise: generating the encrypted initial tweak value by encrypting an initial tweak value.

In some example embodiments, the encrypting of the initial tweak value may comprise: repeatedly updating the multiplication operation by a serial number corresponding to the random position.

In some example embodiments, a number of cycles which are required to update the multiplication operation may be smaller than a number of cycles which are required to perform the encryption, decryption, or encryption and decryption with respect to one block data.

In some example embodiments, the updating of the multiplication operation may comprise performing an exclusive-OR (XOR) operation, a shift operation, or the exclusive-OR (XOR) operation and the shift operation.

In some example embodiments, the at least one crypto core may include a plurality of crypto cores. The encryption, decryption, or encryption and decryption may be performed in each of the plurality of crypto cores.

In some example embodiments, the performing of the encryption, decryption, or encryption and decryption may comprise simultaneously performing the encryption, decryption, or encryption and decryption with respect to the sequential block data in each of the plurality of crypto cores.

In some example embodiments, the performing of the encryption, decryption, or encryption and decryption may comprise sequentially receiving tweak values which are required to perform the encryption, decryption, or encryption and decryption in each of the plurality of crypto cores.

In some example embodiments, the performing of the encryption, decryption, or encryption and decryption may comprise sequentially performing the encryption, decryption, or encryption and decryption with respect to the sequential block data in each of the plurality of crypto cores.

In some example embodiments, the method may further comprise: sequentially generating additional tweak values which are required in the encryption, decryption, or encryption and decryption from the tweak value; and/or storing the tweak value and the additional tweak values.

In some example embodiments, a method for encryption of data in a crypto device having a plurality of crypto cores may comprise: performing an initial operation to encrypt an initial tweak value; performing at least one multiplication operation using the encrypted initial tweak value and a primitive element to generate a tweak value about a position of random block data; and/or sequentially performing data encryption operations from the random block data using the tweak value in each of the plurality of crypto cores.

In some example embodiments, the method may further comprise: determining whether an operating mode of the crypto device is an acceleration mode.

In some example embodiments, when the operating mode is the acceleration mode, the data encryption operations may be simultaneously performed in the plurality of crypto cores.

In some example embodiments, when the operating mode is the acceleration mode, the data encryption operations may be sequentially performed in the plurality of crypto cores.

In some example embodiments, the method may further comprise: sequentially receiving the tweak values, which are required in the data encryption operations, from the plurality of crypto cores.

In some example embodiments, the method may further comprise: receiving information about the position of the random block data.

In some example embodiments, the method may further comprise: determining whether to bypass an encryption operation with respect to sector data. The crypto device performs an encryption operation with respect to a plurality of sequential sector data. Each of the plurality of sequential sector data comprises sequential block data.

In some example embodiments, the determining of whether to bypass the encryption operation may comprise deciding whether an error exists in the one of the sector data.

In some example embodiments, the method may further comprise: continually updating a multiplication operation corresponding to bypassed sector data to calculate a tweak value of a next sector when the one of the sector data is bypassed in the encryption operation.

In some example embodiments, a crypto device may comprise: at least one tweak value generator configured to generate tweak values, which are required to perform data encryption operations, from block data of random position; and/or a plurality of crypto cores configured to sequentially encrypt, decrypt, or encrypt and decrypt the block data using the tweak values.

In some example embodiments, the tweak value generator may comprise tweak value generators, each of which is configured to provide the tweak values to each of the plurality of crypto cores.

In some example embodiments, the tweak value generator may be configured to sequentially provide the tweak values to the plurality of crypto cores.

In some example embodiments, the crypto device may further comprise: a plurality of storage units configured to store the tweak values.

In some example embodiments, the tweak values may comprise first tweak values and second tweak values. The plurality of storage units may comprise: a first storage unit configured to sequentially store first tweak values; and/or a second storage unit configured to sequentially store second tweak values.

In some example embodiments, a storage device may comprise: at least one nonvolatile memory device; and/or a memory controller configured to control the at least one nonvolatile memory device. The memory controller may comprise: an error correction code circuit configured to detect or correct errors about each of sequential sector data; and/or a crypto circuit configured to randomly encrypt, decrypt, or encrypt and decrypt the sector data.

In some example embodiments, the crypto circuit may be configured to sequentially perform an encryption, decryption, or encryption and decryption with respect to the sector data when an error does not exist in the sector data.

In some example embodiments, the crypto circuit may be configured to bypass one of the sector data in encryption, decryption, or encryption and decryption when an error exists in one of the sector data.

In some example embodiments, the error correction code circuit may be configured to correct an error about the one of the sector data when the error exists in the one of the sector data. The crypto circuit may be configured to perform an encryption, decryption, or encryption and decryption with respect to the corrected sector data.

In some example embodiments, the one of the sector data may be newly inputted from an external device when the error exists in the one of the sector data. The crypto circuit may be configured to perform encryption, decryption, or encryption and decryption with respect to the newly inputted sector data.

In some example embodiments, the storage device may comprise a solid state drive (SSD).

In some example embodiments, a method for encryption, decryption, or encryption and decryption of block data may comprise: generating tweak values corresponding to the block data at random positions; and/or performing the encryption, decryption, or encryption and decryption of the block data using the tweak values.

In some example embodiments, wherein the generating of the tweak values may comprise: performing multiplication operations in which primitive elements are multiplied by encrypted initial tweak values.

In some example embodiments, the method may further comprise: generating the encrypted initial tweak values by encrypting an initial tweak value.

In some example embodiments, the encrypting of the initial tweak value may comprise: updating the multiplication operation by a serial number corresponding to the random position.

In some example embodiments, a number of cycles which are required to update the multiplication operation may be smaller than a number of cycles which are required to perform the encryption, decryption, or encryption and decryption with respect to one block data.

In some example embodiments, the updating of the multiplication operation may comprise performing an exclusive-OR (XOR) operation, a shift operation, or the exclusive-OR (XOR) operation and the shift operation.

BRIEF DESCRIPTION OF THE FIGURES

The above and/or other aspects and advantages will become more apparent and more readily appreciated from the following detailed description of example embodiments, taken in conjunction with the accompanying drawings, in which.

DETAILED DESCRIPTION

Figure 1:
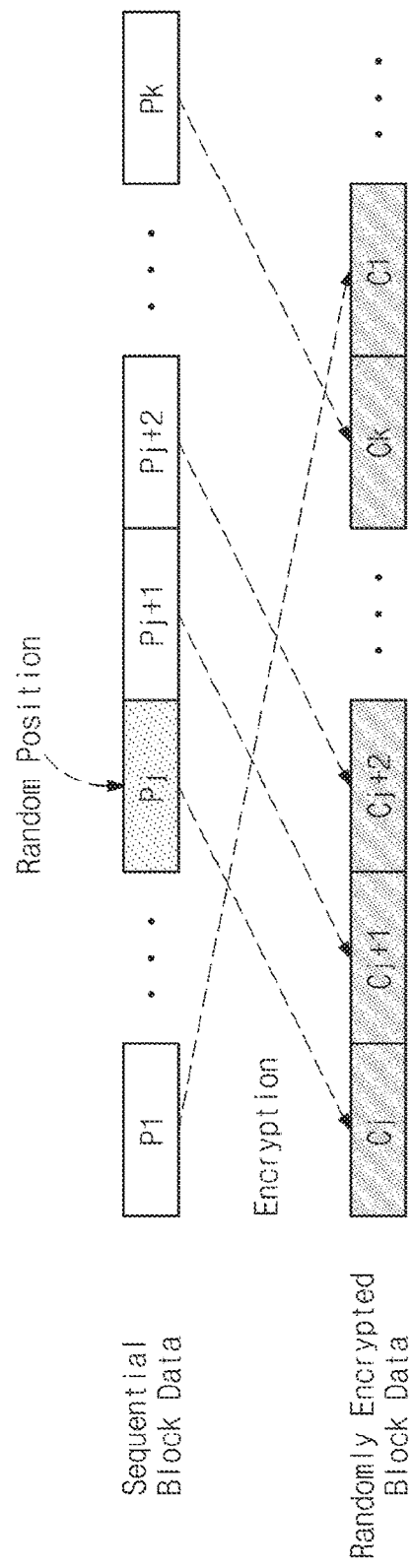
FIG. 1 is a block diagram for describing at least one example embodiment of the inventive concepts.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram for describing the scope and spirit of the inventive concepts. Referring to FIG. 1, an encryption operation according to at least one example embodiment of the inventive concepts may randomly encrypt any block data Pj (e.g., 'j' is an integer of one or more) among a plurality of sequential block data P1 to Pk (e.g., 'k' is an integer of two or more). That is, the encryption operation may start from the block data Pj, which is located at a random position, from among the block data P1 to Pk. In FIG. 1, after the encryption operation is sequentially performed from the block data Pj of the random position, the encryption operation may be performed with respect to first block data P1. However, the encryption operation according to at least one example embodiment of the inventive concepts is not limited thereto.

Meanwhile, the encryption operation is described in FIG. 1. However, the inventive concepts are not limited thereto. At least one example embodiment of the inventive concepts may be similarly applied to a decryption operation.

In at least one example embodiment, the encryption operation according to at least one example embodiment of the inventive concepts may be applied to various kinds of operating modes in which a block cipher where secret information is encrypted by a block is performed. Here, an operating mode may be an electronic codebook (ECB); a cipher block chaining (CBC); a cipher feedback (CFB); an output feedback (OFB); a counter (CTR); a Liskov, Rivest, and Wagner (LRW) tweakable block cipher; an XOR-encrypt-XOR (XEX); an XEX encryption mode with tweak and cipher text stealing (XTS); a CBC mask CBC (CMC); an ECB mask electronic security broker (ESB) (EME); or the like. For convenience of the following description, it is assumed that an operating mode is an XTS mode.

In a general XTS mode, an encryption/decryption about data stored in a sector-based device may be performed. The encryption/decryption operation may be performed using a new key or a tweak value by a sector, because the encryption/decryption operation is performed by a sector. Here, a size of a sector may include 512 Bytes, 520 Bytes, 1K Bytes, 4K Bytes, and the like. Because an encryption/decryption is performed by a sector when the encryption/decryption is performed in the XTS mode, it may be difficult to encrypt and to decrypt data, which is located at a random position in a sector.

On the other hand, at least one example embodiment of the inventive concepts may begin an encryption/decryption about block data, which is located at a random position, in a sector. Accordingly, at least one example embodiment of the inventive concepts may reduce a time about an encryption/decryption and may reduce power consumption by the time about the encryption/decryption.

Generally, a storage device may mainly use advanced encryption standard (AES)-XTS block cipher. An AES-XTS block encryption/decryption are briefly described below.

Figure 2:
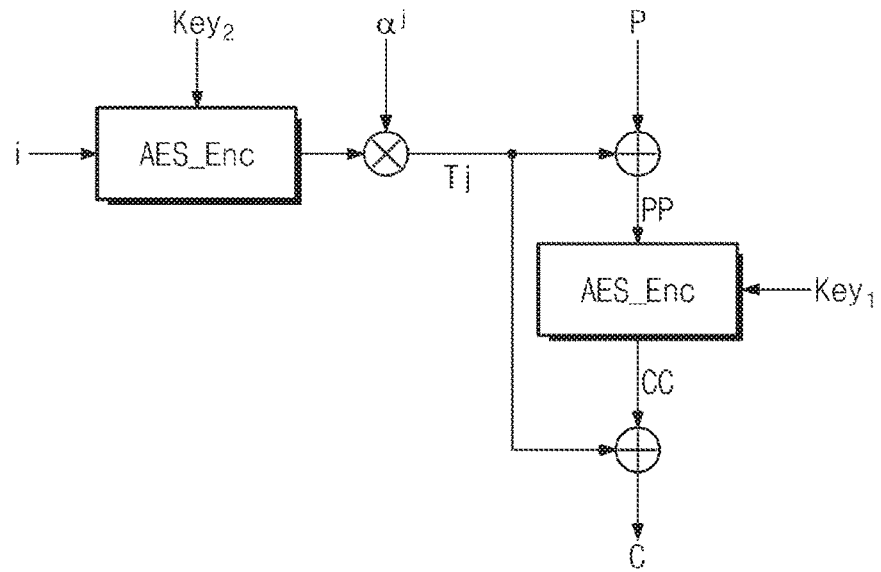
FIG. 2 is a block diagram illustrating an AES-XTS block encryption process.

FIG. 2 is a block diagram illustrating an AES-XTS block encryption process. Referring to FIG. 2, a block encryption process is as follows. An exclusive-OR (XOR) operation may be executed with respect to block data P, which is a plain text, and a tweak value Tj. Here, the tweak value Tj may be a value obtained by multiplying a first encryption operation value by an update value $\alpha^j$ about a primitive element $\alpha$. The first encryption operation value may be a value in which an initial tweak value 'i' is encrypted using a second key $Key_2$, and 'j' may be a serial number corresponding to position information of block data P among a plurality of block data. Here, a first encryption operation may be performed by an AES algorithm. A second encryption operation value CC may be a value in which an XOR operation value PP is encrypted using a first key $Key_1$. Here, a second encryption operation may be performed by an AES algorithm. Encrypted block data C which is a cipher text may be generated by executing an XOR operation with respect to the second encryption operation value CC and the tweak value Tj.

In at least one example embodiment, the first encryption operation and the second encryption operation may be processed in one crypto core. In at least one example embodiment, the first encryption operation and the second encryption operation may be processed in different crypto cores.

Figure 3:
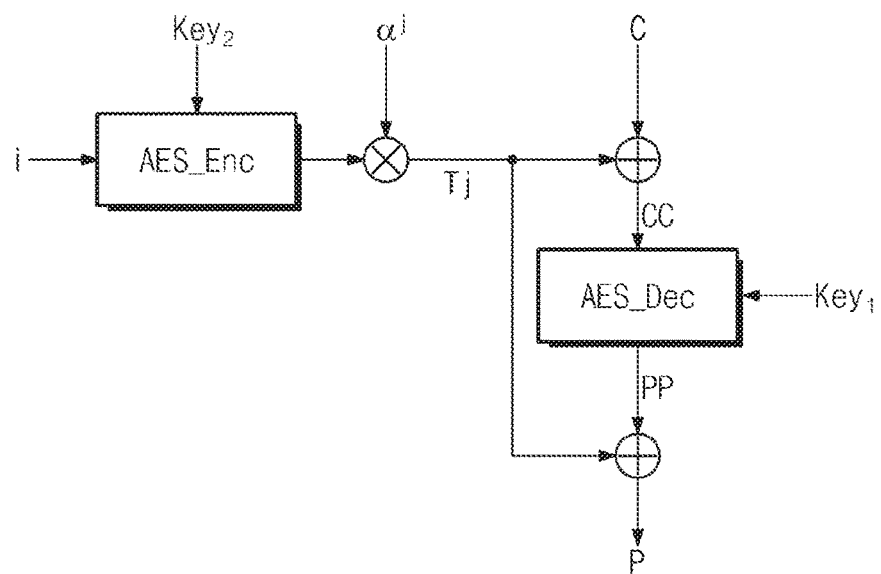
FIG. 3 is a block diagram illustrating an AES-XTS block decryption process.

FIG. 3 is a block diagram illustrating an AES-XTS block decryption process. Referring to FIG. 3, a block cipher process is as follows. An XOR operation may be executed with respect to encrypted block data C, which is a cipher text, and the tweak value Tj. Here, the tweak value Tj may be a value obtained by performing a modular multiplication with respect to an encryption operation value and an update value $\alpha^j$ about a primitive element $\alpha$. The encryption operation value may be a value in which an initial tweak value 'i' is encrypted using the second key $Key_2$, and 'j' may be a serial number corresponding to position information of the encrypted block data C. A decryption operation value PP may be a value in which an XOR operation value CC is decrypted using the first key $Key_1$. Here, a decryption operation may be performed by an AES algorithm. Block data P which is a plain text may be generated by executing an XOR operation with respect to the decryption operation value PP and the tweak value Tj.

Figure 4:
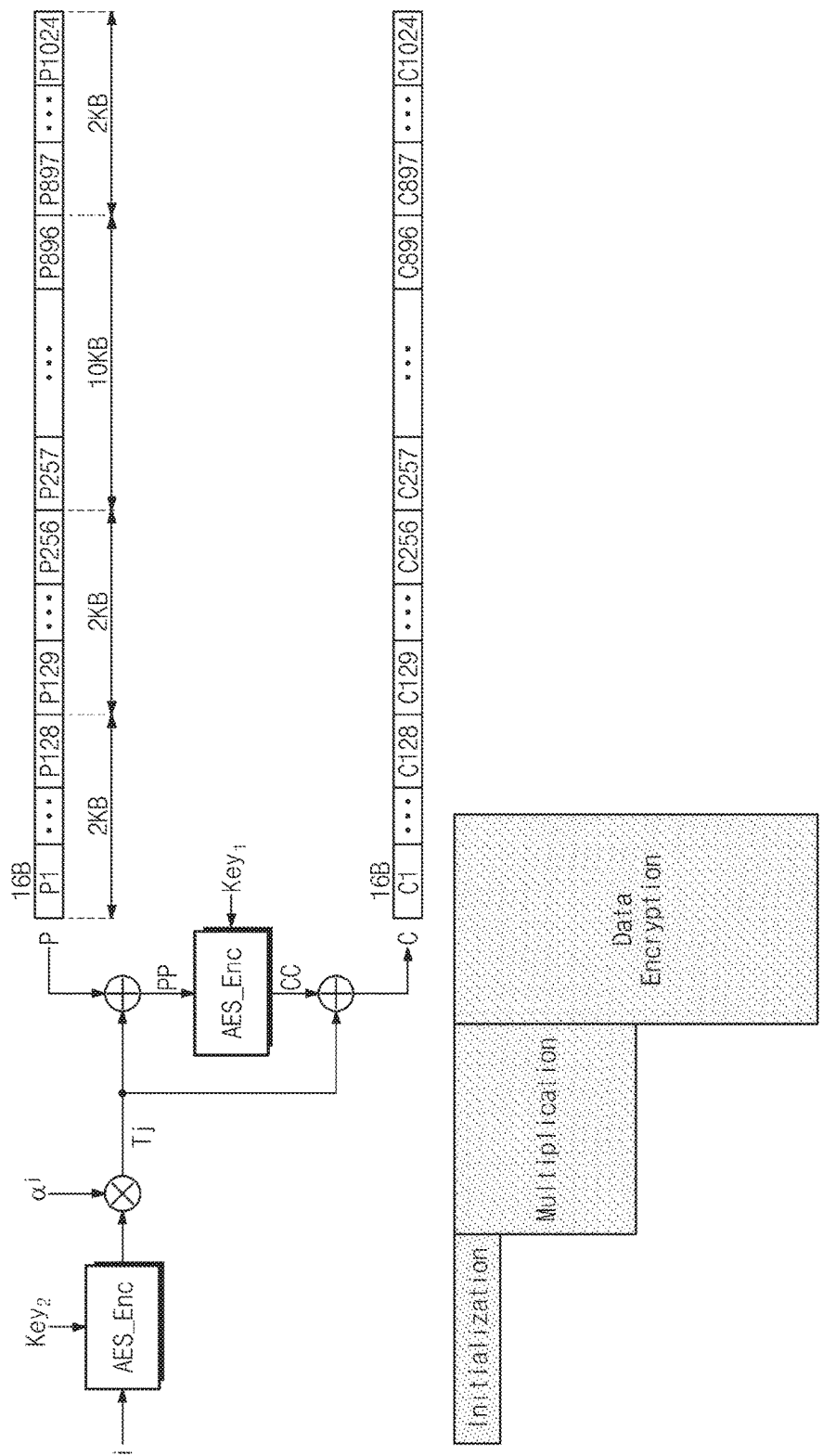
FIG. 4 is a block diagram for describing an encryption operation according to at least one example embodiment of the inventive concepts.

FIG. 4 is a block diagram for describing an encryption operation according to at least one example embodiment of the inventive concepts. Referring to FIG. 4, in an encryption operation, 1024 encrypted block data C1 to C1024 may be generated by encrypting 1024 sequential block data P1 to P1024. Here, the number of block data which is an encryption object may be, but is not limited to, 1024.

In at least one example embodiment, one block data may be 16 Bytes. However, a size of the block data according to at least one example embodiment of the inventive concepts is not limited thereto. Sector data illustrated in FIG. 4 may include 128 block data. In at least one example embodiment, a size of the sector data may be 2 Kbytes. However, the inventive concepts are not limited to the sector data.

As illustrated in FIG. 4, an encryption operation according to at least one example embodiment of the inventive concepts may include an initial operation, a multiplication operation, and a data encryption operation.

In the initial operation, an encrypted tweak value may be generated by encrypting the initial tweak value 'i' using the second key $Key_2$ and an encryption algorithm AES_Enc. In the multiplication operation, the tweak value Tj may be generated by multiplying a value, in which a primitive element $\alpha$ is updated by a serial number 'j' corresponding to the encrypted tweak value, by the encrypted tweak value. In the data encryption operation, encrypted block data C1 to C1024 may be respectively generated by encrypting block data P1 to P1024 using the first key $Key_1$, the updated tweak value Tj, and the encryption algorithm AES_Enc.

In at least one example embodiment, the data encryption operation may sequentially start from a random position of any block data among the block data P1 to P1024.

In at least one example embodiment, the data encryption operation may be performed in a plurality of crypto cores in parallel.

Meanwhile, in FIG. 4, at least one example embodiment of the inventive concepts is exemplified as the multiplication operation and the data encryption operation are distinguished, but the inventive concepts are not limited thereto. Because the number of cycles which is required in the multiplication operation is relatively much smaller than the number of cycles which is required in the data encryption operation, the multiplication operation may be included in the data encryption operation. Meanwhile, the inventive concepts are not limited to the encryption operation (e.g., the initial operation, the multiplication operation, and the data encryption operation).

An encryption operation performed in parallel in a plurality of crypto cores will be described below.

Figure 5:
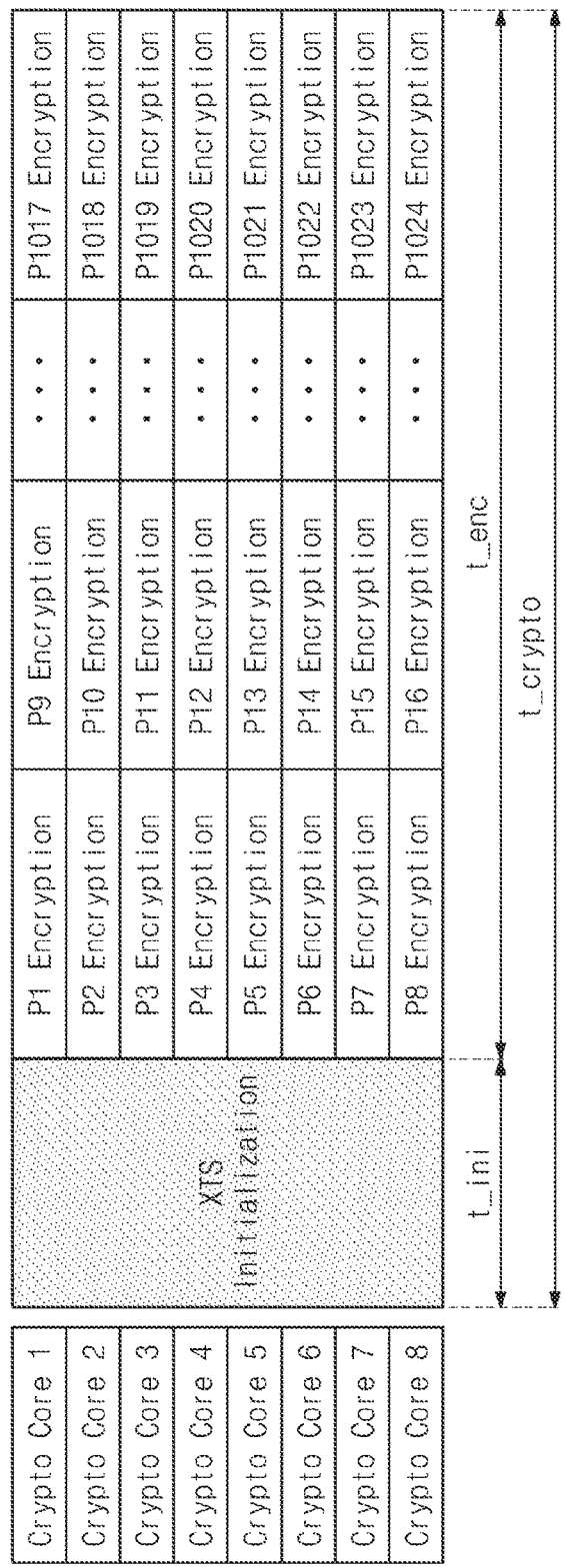
FIG. 5 is a timing diagram illustrating an encryption operation using a plurality of crypto cores according to at least one example embodiment of the inventive concepts.

FIG. 5 is a timing diagram illustrating an encryption operation using a plurality of crypto cores according to at least one example embodiment of the inventive concepts. For convenience of the following description, in FIG. 5, it is assumed that eight crypto cores are used. However, the inventive concepts are not limited to the number of crypto cores used in an encryption operation. Moreover, timing based on a crypto core may refer to an encryption operation illustrated in FIG. 5. Accordingly, timing about a multiplication operation, which is illustrated in FIG. 4, performed outside a crypto core may not be illustrated in FIG. 5. In FIG. 5, it is assumed that a multiplication operation is included in a data encryption operation about each block.

Referring to FIG. 5, a total encryption operating time t_crypto may include an initial operating time t_ini and a data encryption operating time t_enc.

In the initial operating time t_ini, an initial operation which is required in an XTS mode may be performed. An encrypted tweak value may be generated using the initial tweak value 'i' and an encryption algorithm.

In the data encryption operating time t_enc, each of crypto cores may receive a tweak value which is required in an encryption operation about corresponding block data and may sequentially perform a data encryption operation from the corresponding block data using the updated tweak value Tj and the first key $Key_1$. For example, a first crypto core may sequentially encrypt first block data P1, ninth block data P9, . . . , 1017th block data P1017. The remaining crypto cores may similarly perform a data encryption operation.

In at least one example embodiment, the tweak value Tj may be inputted from a plurality of multipliers respectively corresponding to the crypto cores. Here, each of the multipliers may perform a multiplication operation illustrated in FIG. 4. In at least one example embodiment, the tweak value Tj may be inputted from a plurality of registers respectively corresponding to the crypto cores. Here, the tweak values respectively stored in the registers may be generated from one multiplier. Here, a multiplier may perform a multiplication operation illustrated in FIG. 4. The inventive concepts are not limited to the encryption operation.

Meanwhile, because it is assumed that tweak values (e.g., Tj) which are required in a data encryption operation are simultaneously inputted to crypto cores, respectively, a tweak value input time may not be illustrated. However, the inventive concepts are not limited thereto. In an encryption operation according to at least one example embodiment of the inventive concepts, the tweak values may be sequentially inputted to the crypto cores.

Figure 6:
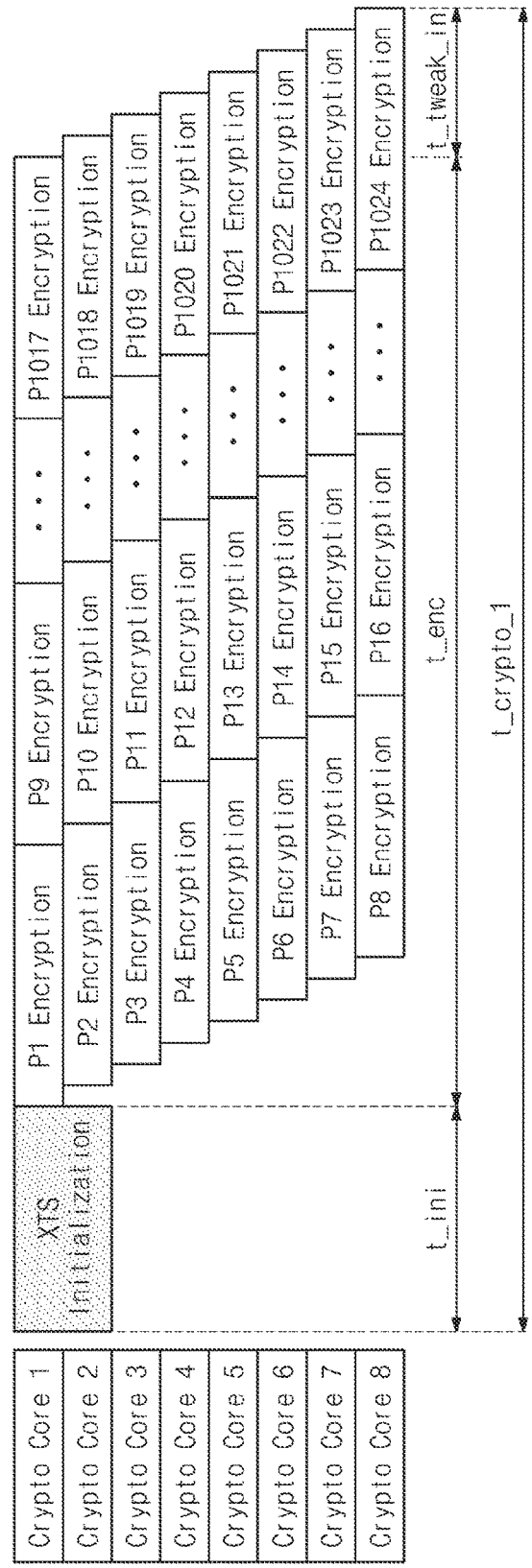
FIG. 6 is a timing diagram illustrating an encryption operation using a plurality of crypto cores according to at least one example embodiment of the inventive concepts.

FIG. 6 is a timing diagram illustrating an encryption operation using a plurality of crypto cores according to at least one example embodiment of the inventive concepts. Referring to FIG. 6, in an encryption operation, a data encryption operation may sequentially start in each of crypto cores, compared with a timing diagram illustrated in FIG. 5. The reason may be that corresponding updated tweak values are sequentially inputted. Accordingly, as illustrated in FIG. 6, a total encryption operating time t_crypto_1 may further include a tweak value input time t_tweak_in, compared with a timing diagram that illustrated in FIG. 5. Here, the tweak value input time t_tweak_in may be a time in which tweak values are sequentially inputted to second to eighth crypto cores. Meanwhile, the inventive concepts are not limited to the encryption operation illustrated in FIG. 6.

Meanwhile, the reason why a data encryption operation is sequentially performed in crypto cores may be because tweak values are sequentially inputted, otherwise the reason may be because data is sequentially inputted. For example, because data of 16 Bytes is sequentially inputted to each crypto core, a tweak value may be sequentially updated during the time when the data is inputted.

Meanwhile, in an encryption operation according to at least one example embodiment of the inventive concepts, a data encryption operation may start from a position of random block data. The tweak value Tj corresponding to random block data may be set to perform a data encryption operation at a position of the random block data.

Figure 7:
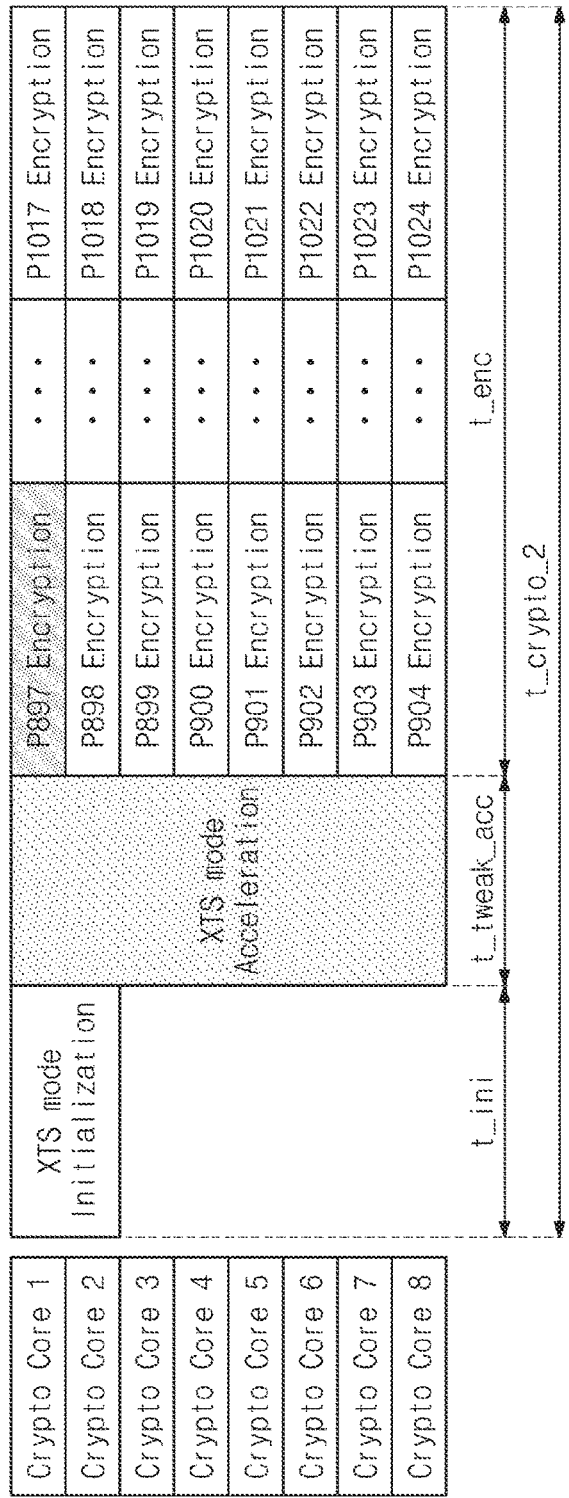
FIG. 7 is a timing diagram illustrating an encryption operation using a plurality of crypto cores according to at least one example embodiment of the inventive concepts.

FIG. 7 is a timing diagram illustrating an encryption operation using a plurality of crypto cores according to at least one example embodiment of the inventive concepts. An encryption operation of FIG. 7 may be different from that of FIG. 5 in that an encryption operation starts from block data P897. Here, the block data P897 from which a data encryption operation starts may be, but not limited to, an example.

In a general encryption operation, when an error about block data occurs because the block data is sequentially encrypted, the error may be corrected, and the block data may be encrypted. Accordingly, an error correction time about the block data may be included in an encryption operating time. However, in an encryption operation according to at least one example embodiment of the inventive concepts, first error-free block data may be encrypted and, at the same time, an error about block data may be corrected by beginning an encryption operation at a random position. Accordingly, the error correction time may be included in a total encryption operating time t_crypto_2. Due to an above description, beginning a data encryption operation from block data of a random position may be referred to as "acceleration mode of an encryption operation".

In FIG. 7, a data encryption operation may start from 897th block data P897 to accelerate an encryption operation. Accordingly, a total encryption operating time t_crypto_2 may further include an XTS mode acceleration time t_tweak_acc in which a tweak value (T897) corresponding to the 897th block data P897 is generated, compared with a timing diagram illustrated in FIG. 5.

Figure 8:
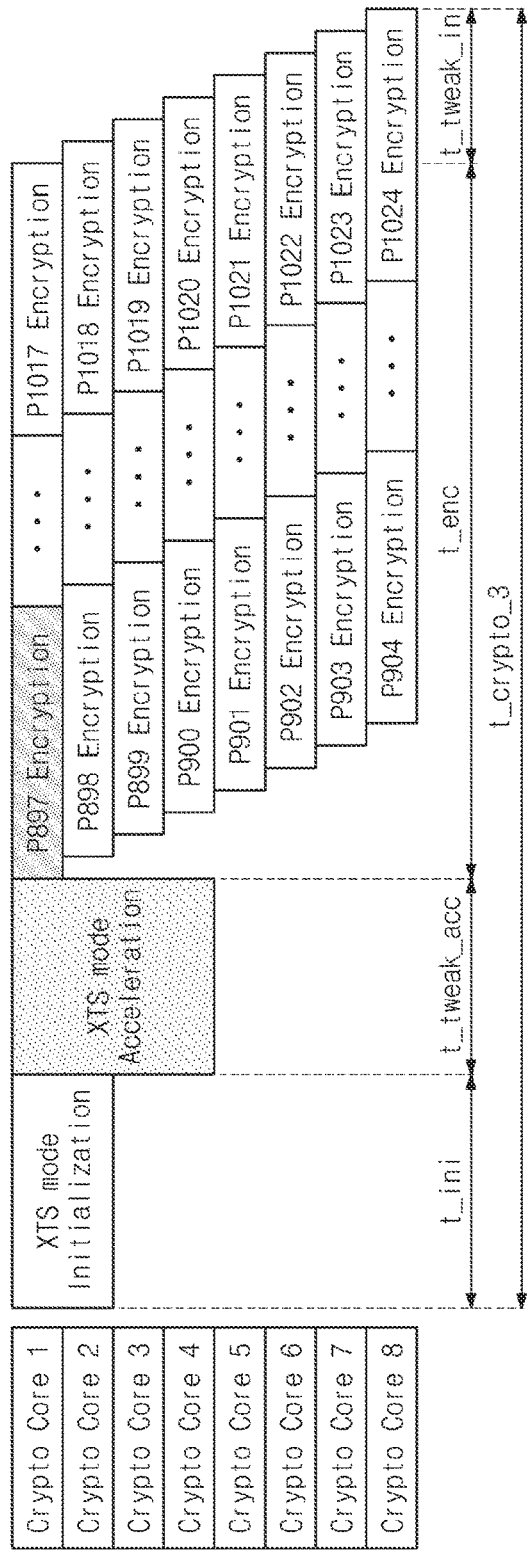
FIG. 8 is a timing diagram illustrating an encryption operation using a plurality of crypto cores according to at least one example embodiment of the inventive concepts.

FIG. 8 is a timing diagram illustrating an encryption operation using a plurality of crypto cores according to at least one example embodiment of the inventive concepts. Referring to FIG. 8, in an encryption operation, a data encryption operation may sequentially start in each of a plurality of crypto cores, compared with a timing diagram illustrated in FIG. 7. Accordingly, a total encryption operating time t_crypto_3 may further include a tweak value input time t_tweak_in, compared with the timing diagram illustrated in FIG. 7.

Meanwhile, in FIGS. 5 and 8, the data encryption operation may be simultaneously or sequentially performed in each of crypto cores. However, the inventive concepts are not limited to the encryption operation. The data encryption operations may be sequentially or simultaneously performed in each of crypto cores according to at least one example embodiment of the inventive concepts.

Figure 9:
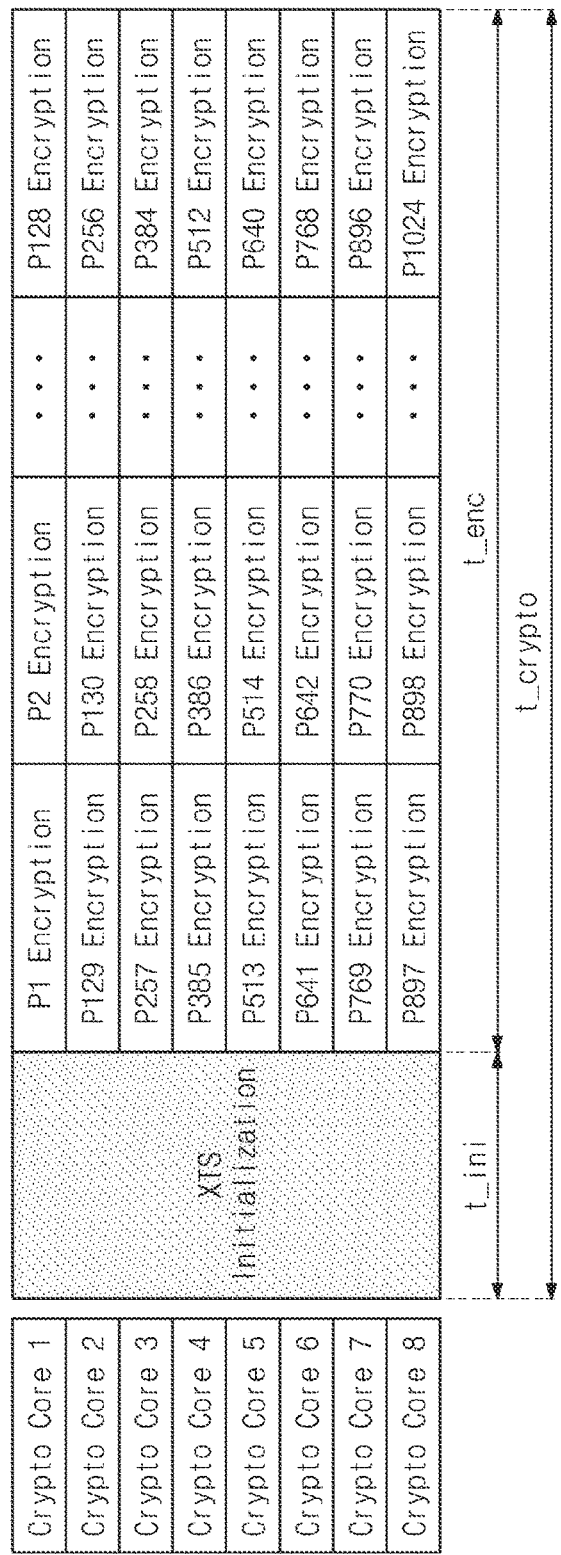
FIG. 9 is a timing diagram illustrating an encryption operation using a plurality of crypto cores according to at least one example embodiment of the inventive concepts.

FIG. 9 is a timing diagram illustrating an encryption operation using a plurality of crypto cores according to at least one example embodiment of the inventive concepts. Referring to FIG. 9, an encryption operation may be sequentially performed in each of the crypto cores. For example, first to 128th block data P1 to P128 may be sequentially encrypted in a first crypto core. As the first crypto core sequentially encrypts the first to 128th block data P1 to P128, the remaining crypto cores may perform a data encryption operation.

A multiplication operation (e.g., an update operation) using a primitive element α which is required to calculate a tweak value will be described below.

Figure 10:
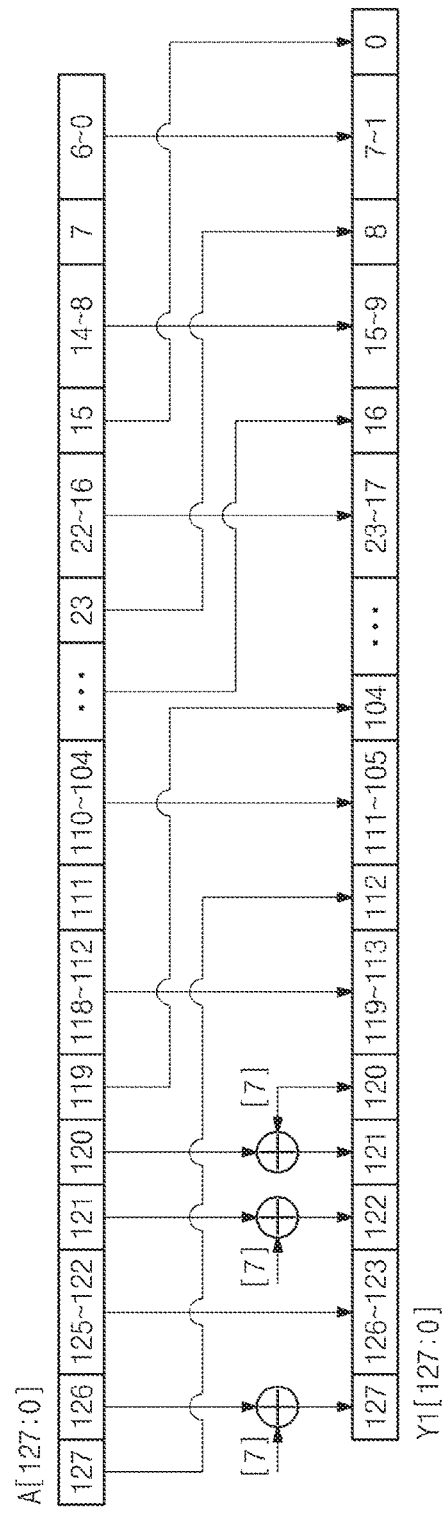
FIG. 10 is a block diagram illustrating a process of performing a multiplication operation using a primitive element.

FIG. 10 is a block diagram illustrating a process of performing a multiplication operation using a primitive element α. For convenience of the following description, it is assumed that an encrypted tweak value which is inputted to a multiplier is A[127:0], and an encrypted tweak value which is outputted from the multiplier is Y1[127:0], as described in FIG. 2. Referring to FIG. 10, a multiplication operation may be expressed by a shift operation or an XOR operation as follows:

Y1[127]=A[126]^A[7], Y1[126:123]=A[125:122], Y1[122]=A[121]^A[7], Y1[121]=A[120]^A[7], Y1[120]= A[7], Y1[119:113]=A[118:112], Y1[112]=A[127], Y1[111:105]=A[110:104], Y1[104]=A[119], Y1[103:97]= A[102:96], Y1[96]=A[111], Y1[95:89]=A[94:88], Y1[88]=A[103], Y1[87:81]=A[86:80], Y1[80]=A[95], Y1[79:73]=A[78:72], Y1[72]=A[87], Y1[71:65]=A[70:64], Y1[64]=A[79], Y1[63:57]=A[62:56], Y1[56]=A[71], Y1[55:49]=A[54:48], Y1[48]=A[63], Y1[47:41]=A[46:40], Y1[40]=A[55], Y1[39:33]=A[38:32], Y1[32]=A[47], Y1[31:25]=A[30:24],

Y1[24]=A[39], Y1[23:17]=A[22:16], Y1[16]=A[31], Y1[15:9]=A[14:8], Y1[8]=A[23], Y1[7:1]=A[6:0], Y1[0]=A[15]. Here, "^" may be an operator indicating an XOR operation.

Figure 11:
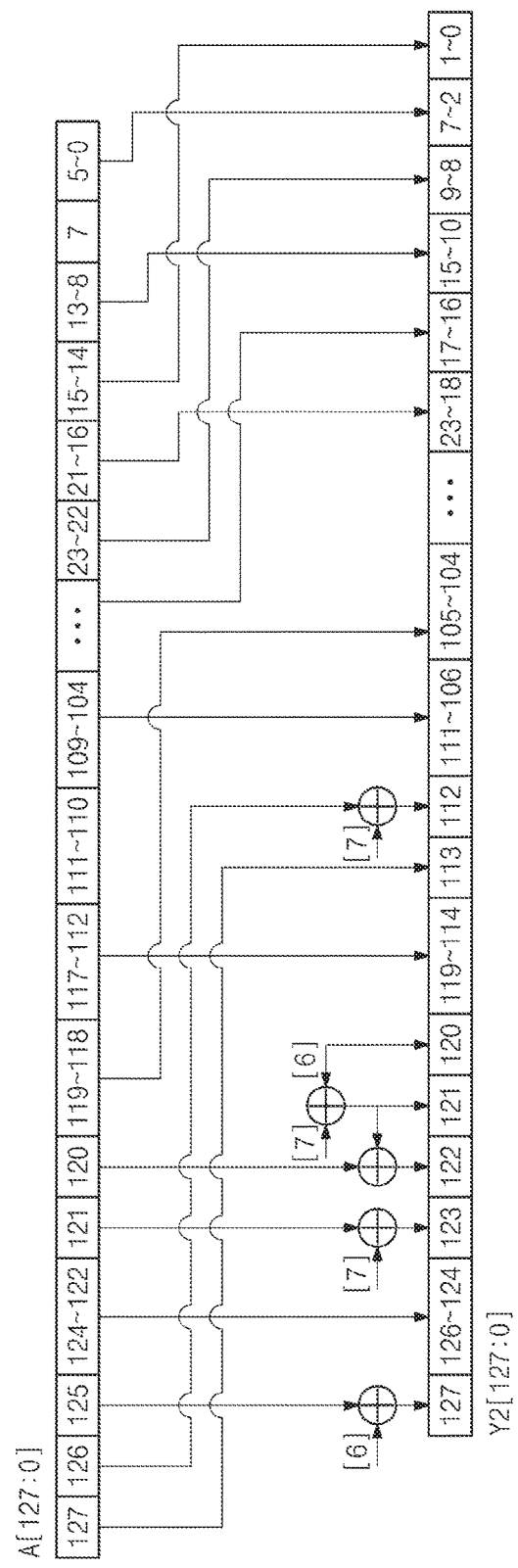
FIG. 11 is a block diagram illustrating a process of performing a multiplication operation twice using a primitive element α.

FIG. 11 is a block diagram illustrating a process of performing a multiplication operation twice using a primitive element α. Referring to FIG. 11, a multiplication operation twice may be expressed by a shift operation or an XOR operation as follows:

Y2[127]=A[125]^A[6], Y2[126:124]=A[124:122], Y2[123]=A[121]^A[7], Y2[122]=A[120]^A[7]^A[6], Y2[121]=A[7]^A[6], Y2[120]=A[6], Y2[119:114]=A[117:112], Y2[113]=A[127], Y2[112]=A[126]^A[7], Y2[111:106]=A[109:104], Y2[105:104]=A[119:118], Y2[103:98]=A[101:96], Y2[97:96]=A[111:110], Y2[95:90]=A[93:88], Y2[89:88]=A[103:102], Y2[87:82]=A[85:80], Y2[81:80]=A[95:94], Y2[79:74]=A[77:72], Y2[73:72]=A[87:86], Y2[71:66]=A[69:64], Y2[65:64]=A[79:78], Y2[63:58]=A[61:56], Y2[57:56]=A[71:70], Y2[55:50]=A[53:48], Y2[49:48]=A[63:62], Y2[47:42]=A[45:40], Y2[41:40]=A[55:54], Y2[39:34]=A[37:32], Y2[33:32]=A[47:46], Y2[31:26]=A[29:24], Y2[25:24]=A[39:38], Y2[23:18]=A[21:16], Y2[17:16]=A[31:30], Y2[15:10]=A[13:8], Y2[9:8]=A[23:22], Y2[7:2]=A[5:0], Y2[1:0]=A[15:14].

Meanwhile, a process in which tweak values Y1 and Y2 are calculated through performing a multiplication operation once or performing a multiplication operation twice is described in FIGS. 10 and 11. Similarly, a tweak value Tj (refer to FIG. 2) which is updated through performing a multiplication operation 'n' times may be calculated.

Figure 12:
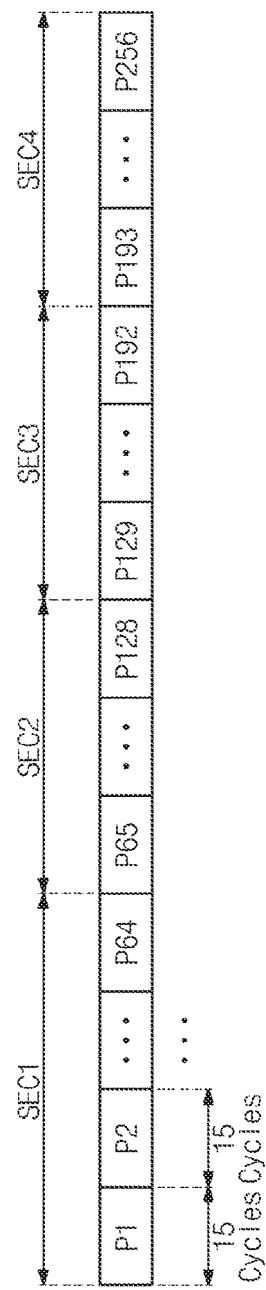
FIG. 12 is a block diagram illustrating an encryption operation in a normal mode of a crypto device according to at least one example embodiment of the inventive concepts.

FIG. 12 is a block diagram illustrating an encryption operation in a normal mode of a crypto device according to at least one example embodiment of the inventive concepts. For convenience of the description, in FIG. 12, it is assumed that four sequential sector data SEC1 to SEC4 are encrypted, a crypto core performs an encryption operation by 16 Bytes, and a time to perform an encryption operation about each block data is 15 cycles. In at least one example embodiment, the size of each of the sector data SEC1 to SEC4 may be 1 Kbyte. However, the inventive concepts are not limited to a size of the sector data.

Referring to FIG. 12, an updated tweak value Tj (refer to FIG. 2) may be generated by performing a multiplication operation by 15 cycles. That is, in a normal mode of encryption operation, the tweak value Tj may be sequentially updated in a crypto core by 15 cycles.

In at least one example embodiment, to perform an encryption operation, 256 updated tweak values may be generated and inputted sequentially by 15 cycles and may be inputted to a crypto core. In at least one example embodiment, to perform an encryption operation, 256 updated tweak values may be generated and stored for a desired number of cycles (which may or may not be predetermined), and corresponding tweak values may be inputted to a crypto core whenever an encryption operation is required.

In at least one example embodiment, the initial tweak value 'i' may be different in an encryption operation about each of sector data SEC1 to SEC4. In at least one example embodiment, the initial tweak value 'i' may be the same as each other in an encryption operation about each of sector data SEC1 to SEC4.

Figure 13:
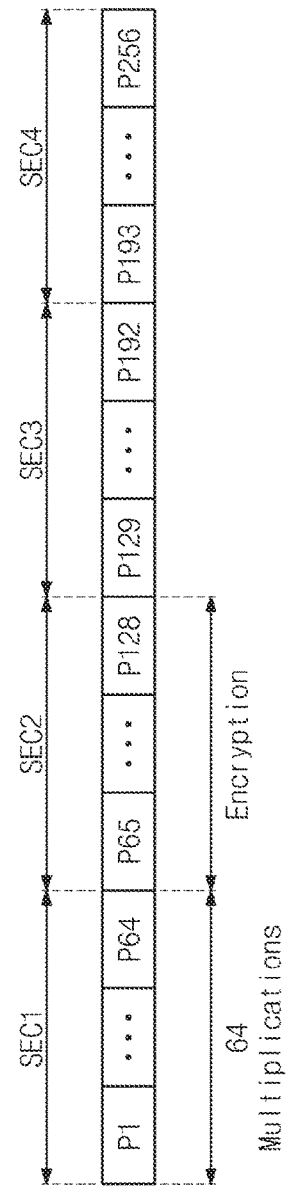
FIG. 13 is a block diagram for describing at least one example embodiment about an encryption operation in an acceleration mode of a crypto device according to at least one example embodiment of the inventive concepts.

FIG. 13 is a block diagram for describing at least one example embodiment about an encryption operation in an acceleration mode of a crypto device according to at least one example embodiment of the inventive concepts. For convenience of the description, in FIG. 13, it is assumed that a data encryption operation starts from 65th block data P65 in the second sector data SEC2 among four sequential sector data SEC1 to SEC4, and each sector data includes 64 block data. Referring to FIG. 13, before a data encryption operation starts with respect to random block data (e.g., P65), a multiplication operation may be performed with respect to the random block data P65 many times (e.g., 64 times). A tweak value (e.g., T65) corresponding to the random block data P65 may be calculated by performing a multiplication operation many times. That is, a tweak value obtained by performing a multiplication operation 64 times may be updated. When one multiplication operation is performed for one cycle, a tweak value may be calculated for 64 cycles. However, the inventive concepts are not limited thereto. A tweak value (T65) may be calculated for 64 cycles, but the tweak value (T65) may be calculated for one cycle. Because a value obtained by performing a multiplication operation 'n' times is previously known, the tweak value (T65) which is updated at a time may be calculated.

In at least one example embodiment, the number of cycles which is required in each of the multiplication operations may be much smaller than the number of cycles (e.g., 15 cycles) which is required in an encryption operation. For example, the multiplication operation may be performed for one cycle. Here, one cycle may be one clock cycle which is used in a crypto core. Here, a multiplication operation may be performed by a plurality of XOR operators.

Figure 14:
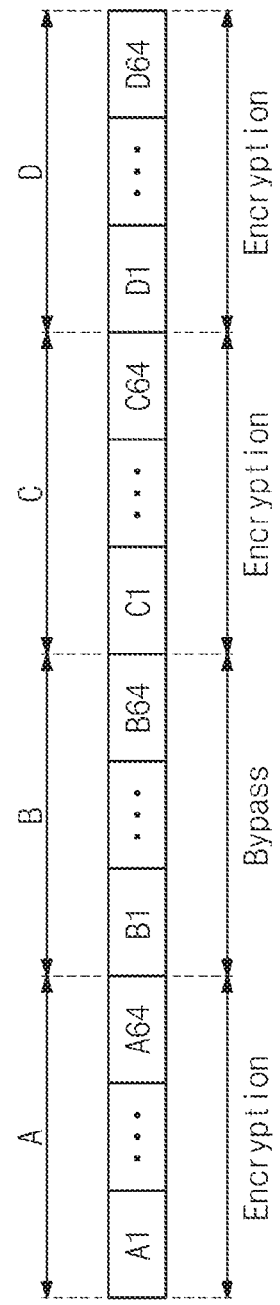
FIG. 14 is a block diagram for describing at least one example embodiment about an encryption operation in an acceleration mode of a crypto device according to at least one example embodiment of the inventive concepts.

FIG. 14 is a block diagram for describing at least one example embodiment about an encryption operation in an acceleration mode of a crypto device according to at least one example embodiment of the inventive concepts. For convenience of the description, an encryption operation about data including four sequential sector data A, B, C, and D is described in FIG. 14. Referring to FIG. 14, the encryption operation according to at least one example embodiment of the inventive concepts may not encrypt but bypass a portion (e.g., B) of the sector data. Even though the second sector data B is bypassed in an encryption operation, a tweak value Tj (refer to FIG. 2) may be continually updated to perform a normal encryption operation with respect to the remaining sector data C and D. The inventive concepts are not limited to the encryption operation.

Meanwhile, as illustrated in FIG. 14, an encryption/decryption operation may be randomly performed by sector data. However, the inventive concepts are not limited thereto. It is understood that an encryption/decryption operation may be randomly performed from a random position in sector data.

Figure 15:
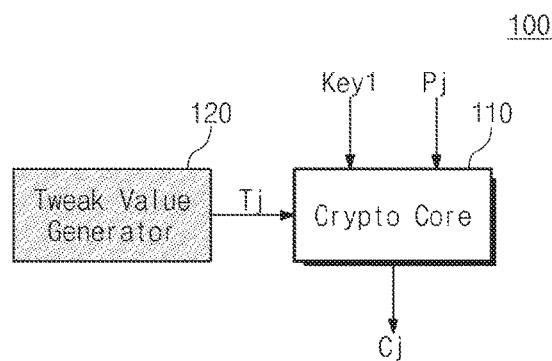
FIG. 15 is a block diagram illustrating a crypto device according to at least one example embodiment of the inventive concepts.

FIG. 15 is a block diagram illustrating a crypto device 100 according to at least one example embodiment of the inventive concepts. Referring to FIG. 15, a crypto device 100 may include a crypto core 110 (e.g., hardware, software) and a tweak value generator 120 (e.g., hardware, software).

The crypto core 110 may receive a key $Key_1$ and a tweak value Tj and may encrypt block data Pj using the key $Key_1$ and the tweak value Tj, and may generate the encrypted block data Cj. Here, 'j' may be a serial number related to a block encryption operation.

The tweak value generator 120 may generate the tweak value Tj which is required in an encryption about j-th block data Pj. In at least one example embodiment, the tweak value generator 120 may generate the tweak value Tj in real time and may output the tweak value Tj to the crypto core 110. The tweak value generator 120 according to at least one example embodiment of the inventive concepts may generate the tweak value Tj so as to begin a data encryption operation from random block data (e.g., Pj) in the crypto core 110.

Meanwhile, the crypto device 100 illustrated in FIG. 15 may include, but not limited to, one crypto core 110. A crypto device according to at least one example embodiment of the inventive concepts may include a plurality of crypto cores.

Figure 16:
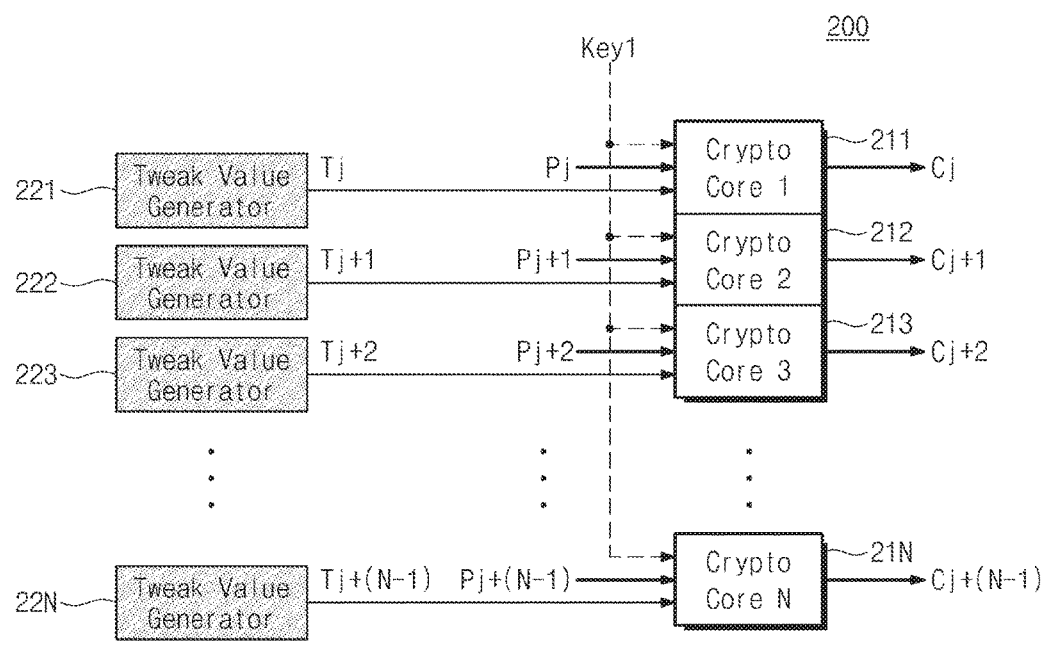
FIG. 16 is a block diagram illustrating a crypto device according to at least one example embodiment of the inventive concepts.

FIG. 16 is a block diagram illustrating a crypto device 200 according to at least one example embodiment of the inventive concepts. Referring to FIG. 16, a crypto device 200 may include a plurality of crypto cores 211 to 21N (e.g., N is an integer of two or more) (e.g., hardware, software) and a plurality of tweak value generators 221 to 22N (e.g., hardware, software).

Each of the crypto cores 211 to 21N may receive the key Key$_1$ and corresponding one of the tweak values Tj to Tj+(N−1). The crypto cores 211 to 21N may encrypt block data Pj to Pj+(N−1) and may generate the encrypted block data Cj to Cj+(N−1), respectively. Each of the crypto cores 211 to 21N may be operated and implemented to be the same as the crypto core 110 illustrated in FIG. 15.

The tweak value generators 221 to 22N may respectively generate the tweak values Tj to Tj+(N−1) which are used in an encryption operation. Meanwhile, the tweak values Tj to Tj+(N−1) may be generated from, but not limited to, the tweak value generators 221 to 22N, respectively. The tweak values may be sequentially generated from one tweak value generator.

Figure 17:
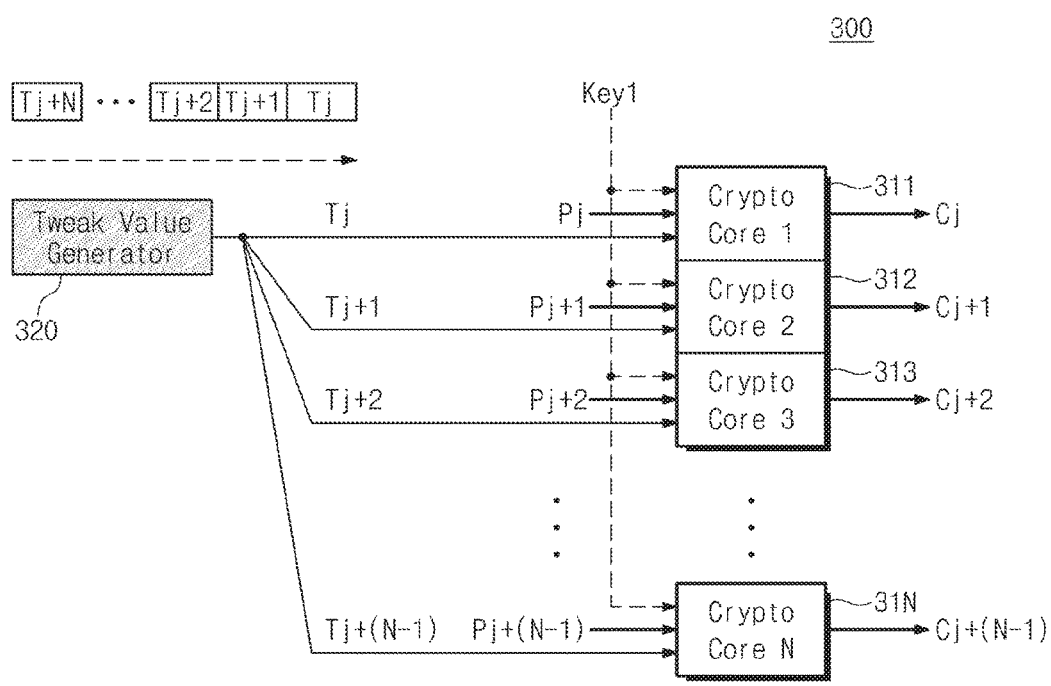
FIG. 17 is a block diagram illustrating a crypto device according to at least one example embodiment of the inventive concepts.

FIG. 17 is a block diagram illustrating a crypto device 300 according to at least one example embodiment of the inventive concepts. Referring to FIG. 17, in a crypto device 300, a function of a plurality of tweak value generators in the crypto device 200 illustrated in FIG. 16 may be implemented with one tweak value generator 320. The tweak value generator 320 may sequentially generate a plurality of tweak values Tj to Tj+(N−1). Meanwhile, a crypto device according to at least one example embodiment of the inventive concepts may further include storage units which temporarily store the tweak values Tj to Tj+(N−1).

Figure 18:
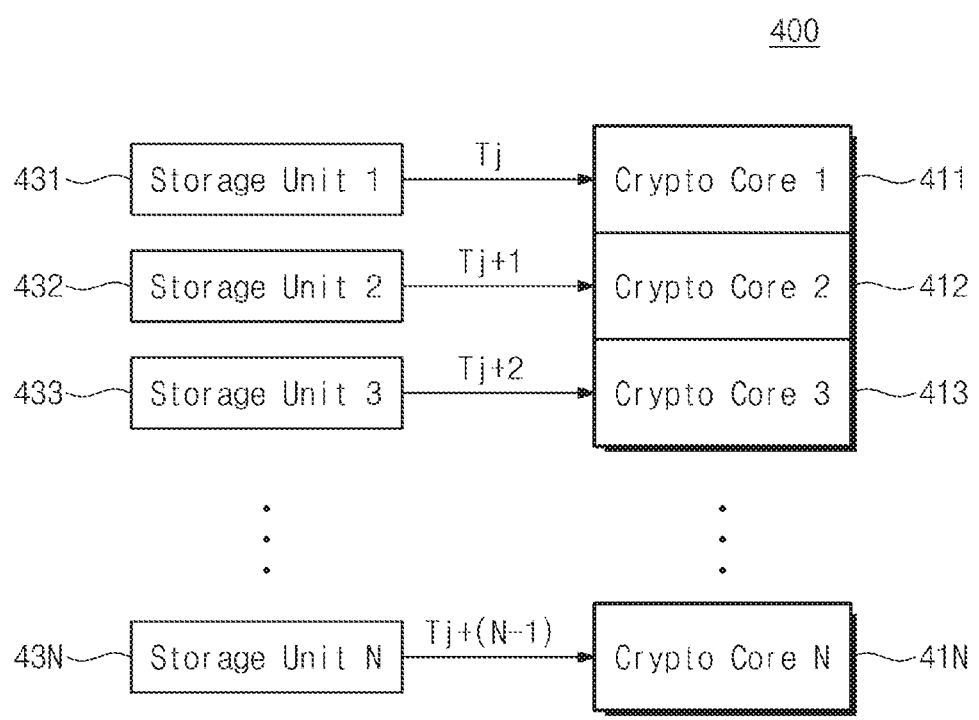
FIG. 18 is a block diagram illustrating a crypto device according to at least one example embodiment of the inventive concepts.

FIG. 18 is a block diagram illustrating a crypto device 400 according to at least one example embodiment of the inventive concepts. Referring to FIG. 18, a crypto device 400 may include a plurality of crypto cores 411 to 41N and a plurality of storage units 431 to 43N.

The storage units 431 to 43N may store the tweak values Tj to Tj+(N−1), respectively. Here, the tweak values Tj to Tj+(N−1) may be inputted from the tweak value generators 221 to 22N illustrated in FIG. 16 or the tweak value generator 320 illustrated in FIG. 17. In at least one example embodiment, each of the storage units 431 to 43N may be implemented with a register.

Meanwhile, the storage units 431 to 43N in FIG. 18 may be distinguished from the crypto cores 411 to 41N, respectively. However, the inventive concepts are not limited thereto. The storage units 431 to 43N may be located in the corresponding crypto cores 411 to 41N, respectively.

Meanwhile, the storage units 431 to 43N in FIG. 18 may be arranged in the crypto cores 411 to 41N, respectively. However, the inventive concepts are not limited to the storage units. A crypto device according to at least one example embodiment of the inventive concepts may include storage units which are shared by crypto cores.

Figure 19:
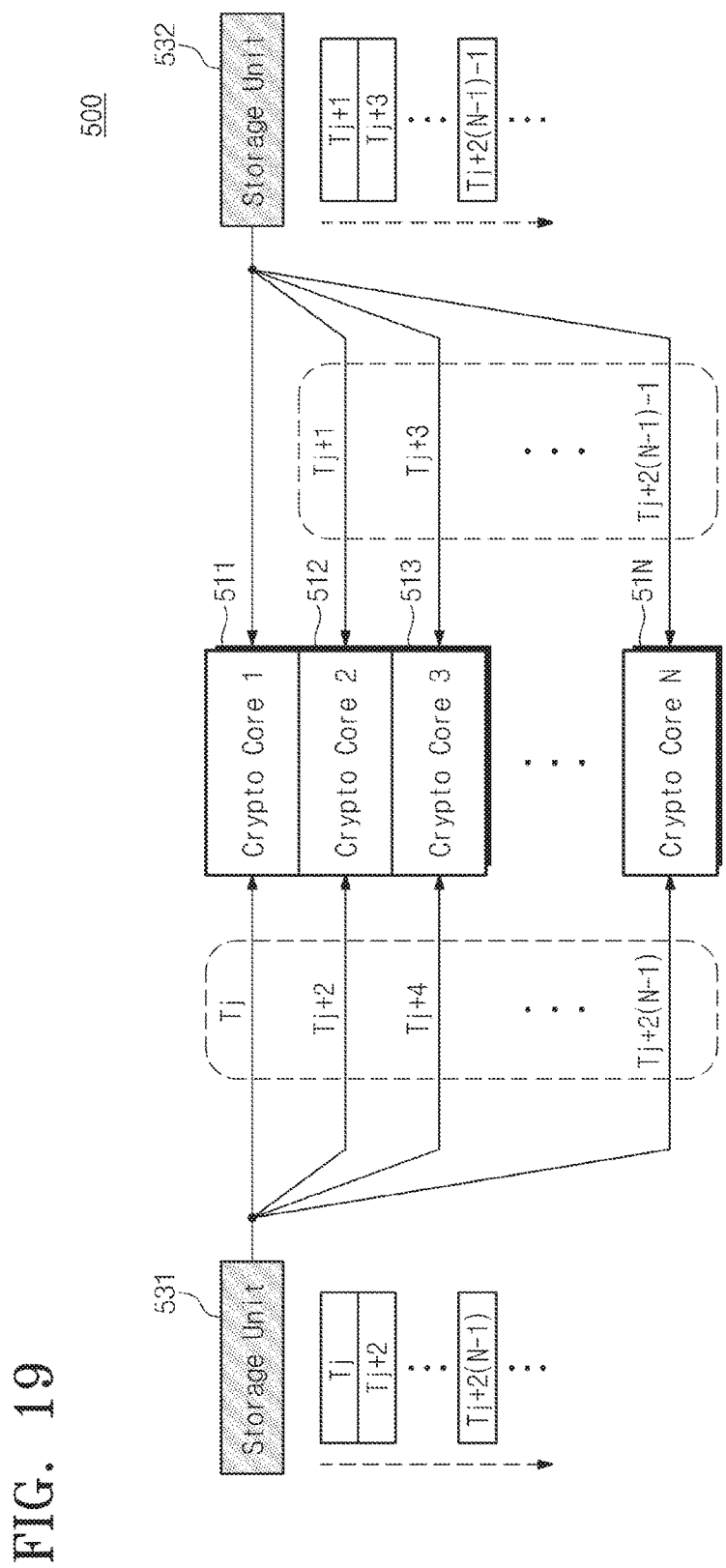
FIG. 19 is a block diagram illustrating a crypto device according to at least one example embodiment of the inventive concepts.

FIG. 19 is a block diagram illustrating a crypto device 500 according to at least one example embodiment of the inventive concepts. Referring to FIG. 19, a crypto device 500 may include a plurality of crypto cores 511 to 51N and first and second storage units 531 and 532.

The first storage unit 531 may sequentially store a first tweak values Tj to Tj+2(N−1). Here, the first tweak values Tj to Tj+2(N−1) may be inputted from the tweak value generators 221 to 22N illustrated in FIG. 16 or the tweak value generator 320 (e.g., hardware, software) illustrated in FIG. 17. Each of the crypto cores 511 to 51N may sequentially read the first tweak values Tj to Tj+2(N−1), which are required in an encryption operation, from the first storage unit 531.

The second storage unit 532 may sequentially store a second tweak values Tj+1 to Tj+2(N−1)−1. Here, the second tweak values Tj+1 to Tj+2(N−1)−1 may be inputted from the tweak value generators 221 to 22N illustrated in FIG. 16 or the tweak value generator 320 illustrated in FIG. 17. Each of the crypto cores 511 to 51N may receive a corresponding one among the second tweak values Tj+1 to Tj+2(N−1)−1, which the second storage unit 532 sequentially outputs, required during an encryption operation.

In at least one example embodiment, the first and second tweak values may be updated in the storage units 531 and 532 at a point in time when block data is inputted to a plurality of crypto cores and an encryption/decryption operation starts and at a point in time when a last round of each of the crypto cores is performed.

However, the inventive concepts are not limited to the storage units 531 and 532.

Figure 20:
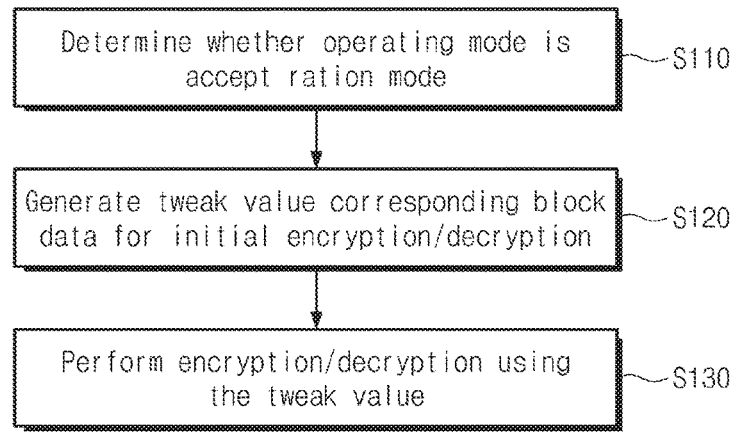
FIG. 20 is a flow chart illustrating an encryption/decryption method of a crypto device according to at least one example embodiment of the inventive concepts.

FIG. 20 is a flow chart illustrating an encryption/decryption method of a crypto device according to at least one example embodiment of the inventive concepts. Referring to FIGS. 1 to 20, an encryption/decryption method of a crypto device is as follows.

Whether an operating mode is an acceleration mode for performing an encryption/decryption operation at high speed may be determined (S110). When the operating mode is the acceleration mode, a tweak value, which corresponds to block data, for performing an initial encryption/decryption operation may be generated (S120). An encryption/decryption operation may be performed from block data using the generated tweak value (S130).

An encryption/decryption method of a crypto device according to at least one example embodiment of the inventive concepts may generate a tweak value for performing an initial encryption in real time, thereby reducing a time about an encryption/decryption, compared with a conventional time about an encryption/decryption.

Meanwhile, a crypto device and an encryption/decryption method according to at least one example embodiment of the inventive concepts may be applied to a storage device.

Figure 21:
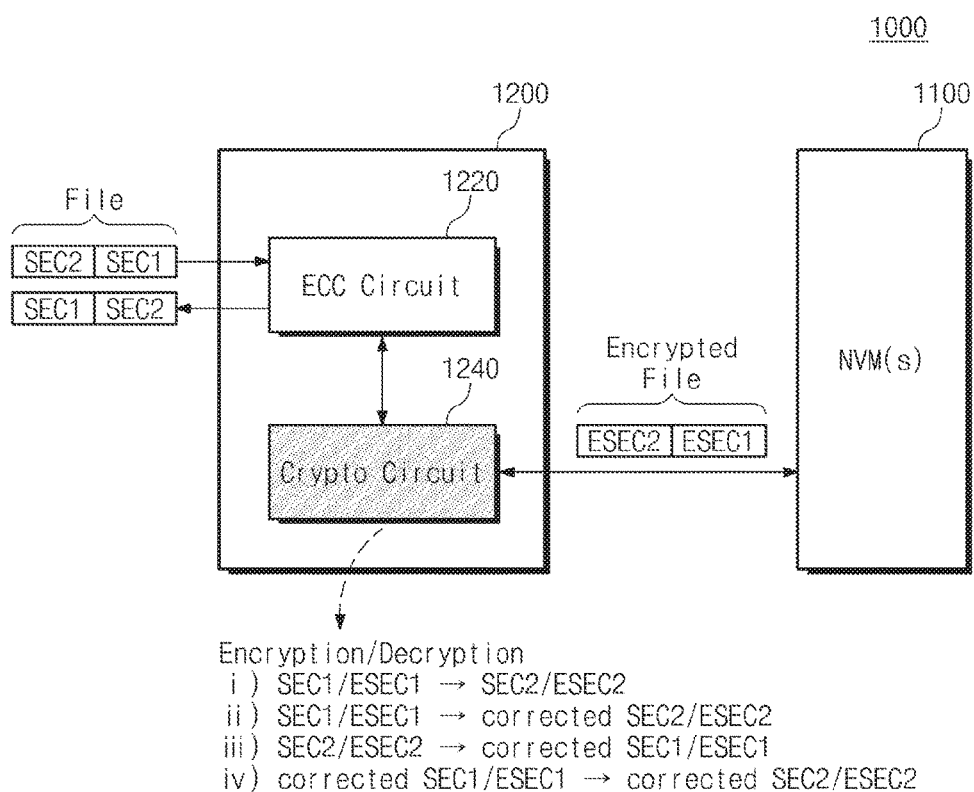
FIG. 21 is a block diagram illustrating a storage device according to at least one example embodiment of the inventive concepts.

FIG. 21 is a block diagram illustrating a storage device 1000 according to at least one example embodiment of the inventive concepts. Referring to FIG. 21, a storage device 1000 may include at least one nonvolatile memory 1100 and a memory controller 1200 for controlling the at least one nonvolatile memory 1100.

The at least one nonvolatile memory 1100 may be a not-AND (NAND) flash memory, a vertical NAND flash memory (VNAND), a NOR flash memory, a resistive random access memory (RRAM), a phase-change memory (PRAM), a magneto-resistive random access memory (MRAM), a ferroelectric random access memory (FRAM), a spin transfer toque random access memory (STT-RAM), or the like. Furthermore, the nonvolatile memory may be implemented to have a three-dimensional array structure.

In at least one example embodiment of the inventive concepts, a three-dimensional (3D) memory array is monolithically formed in one or more physical levels of arrays of memory cells having an active area disposed above a silicon substrate and circuitry associated with the operation of those memory cells, whether such associated circuitry is above or within such substrate. The circuit related on an operation of memory cells may be located in a substrate or on a substrate. The term "monolithic" means that layers of each level of the array are directly deposited on the layers of each underlying level of the array.

In at least one example embodiment of the inventive concepts, the 3D memory array includes vertical NAND strings that are vertically oriented such that at least one memory cell is located over another memory cell. The at least one memory cell may comprise a charge trap layer. Each of a vertical NAND string may include at least one selection transistor which is located on memory cells. At least one selection transistor may have the same structure as memory cells, and be monolithically formed together with memory cells.

The following patent documents, which are hereby incorporated by reference, describe suitable configurations for three-dimensional memory arrays, in which the three-dimensional memory array is configured as a plurality of levels, which is applied by Samsung Electronics Co., with word lines and/or bit lines shared between levels: U.S. Pat. Nos. 7,679,133; 8,553,466; 8,654,587; 8,559,235; and US Pat. Pub. No. 2011/0233648. The nonvolatile memory according to an embodiment of the inventive concept may be applicable to a charge trap flash (CTF) in which an insulating layer is used as a charge storage layer, as well as a flash memory device in which a conductive floating gate is used as a charge storage layer.

As illustrated in FIG. 21, the at least one nonvolatile memory 1100 may store an encrypted file (e.g., including ESEC1 and ESEC2). Here, the encrypted file may be data in which the inputted file (e.g., including SEC1 and SEC2) is encrypted. In FIG. 21, for convenience of the following description, it is assumed that a file includes two sectors SEC1 and SEC2. However, the inventive concepts are not limited to configuration of a file. Moreover, each of sectors SEC1 and SEC2 may include a plurality of block data for an encryption/decryption operation.

The memory controller 1200 may include an error correction code (ECC) circuit 1220 (e.g., hardware, software) and a crypto circuit 1240 (e.g., hardware, software). The ECC circuit 1220 may detect whether an error about each of sectors sequentially inputted from an external device exists and/or may correct the error. Alternatively, the ECC circuit 1220 may detect whether an error about each of encrypted sectors ESEC1 and ESEC2 inputted from the at least one nonvolatile memory 1100 exists and/or may correct the error.

The crypto circuit 1240 may encrypt a file or may decrypt the encrypted file. The crypto circuit 1240 may be implemented using a crypto device or an encryption/decryption method described in FIGS. 1 to 20. The crypto circuit 1240 may begin an encryption/decryption operation from a random sector regardless of an input order of a sector. Accordingly, operations of an encryption/decryption about sectors performed in the crypto circuit 1240 may be four cases as follows.

i) When it is not a need to correct an error about the first and second sectors SEC1/ESEC1 and SEC2/ESEC2, an encryption/decryption may be performed with respect to the first sector SEC1/ESEC1, and an encryption/decryption may be performed with respect to the second sector SEC2/ESEC2.

ii) When it is a need to correct an error about the second sector SEC2/ESEC2, an encryption/decryption may be performed with respect to the first sector SEC1/ESEC1, an error about the second sector SEC2/ESEC2 may be corrected, and an encryption/decryption may be performed with respect to the corrected second sector SEC2/ESEC2.

iii) When it is a need to correct an error about the first sector SEC1/ESEC1, an encryption/decryption may be performed with respect to the second sector SEC2/ESEC2, an error about the first sector SEC1/ESEC1 may be corrected, and an encryption/decryption may be performed with respect to the corrected first sector SEC1/ESEC1.

iv) When it is a need to correct an error about both the first and second sectors SEC1/ESEC1 and SEC2/ESEC2, an error about the first and second sectors SEC1/ESEC1 and SEC2/ESEC2 may be corrected, an encryption/decryption may be performed with respect to the corrected first sector SEC1/ESEC1, and an encryption/decryption may be performed with respect to the corrected second sector SEC2/ESEC2.

As described above, the crypto circuit 1240 according to at least one example embodiment of the inventive concepts may perform an encryption/decryption operation from a random sector regardless of an order of inputted sector data. However, the inventive concepts are not limited to the storage device 1000. In FIG. 21, an error correction operation about sector data in which an error correction is needed is performed. However, the inventive concepts are not limited thereto. A storage device according to at least one example embodiment of the inventive concepts may determine whether an error correction is needed, and the sector data in which an error correction is needed may be requested to an external device again.

Figure 22:
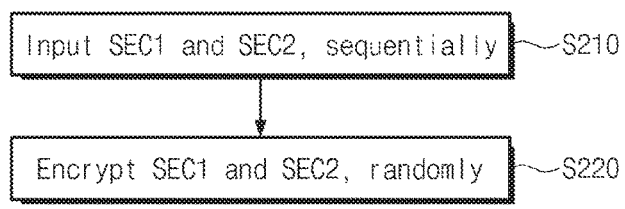
FIG. 22 is a flow chart illustrating a storage device according to at least one example embodiment of the inventive concepts.

FIG. 22 is a flow chart illustrating a storage device according to at least one example embodiment of the inventive concepts. Referring to FIGS. 21 and 22, an encryption method of the storage device 1000 is as follows.

A plurality of sector data (e.g., SEC1 and SEC2) may be sequentially inputted to the storage device 1000 from an external device (S210). The sector data may be randomly encrypted of the sector data (S220).

Meanwhile, each of sector data SEC1 and SEC2 may randomly begin an encryption operation at a random position.

Figure 23:
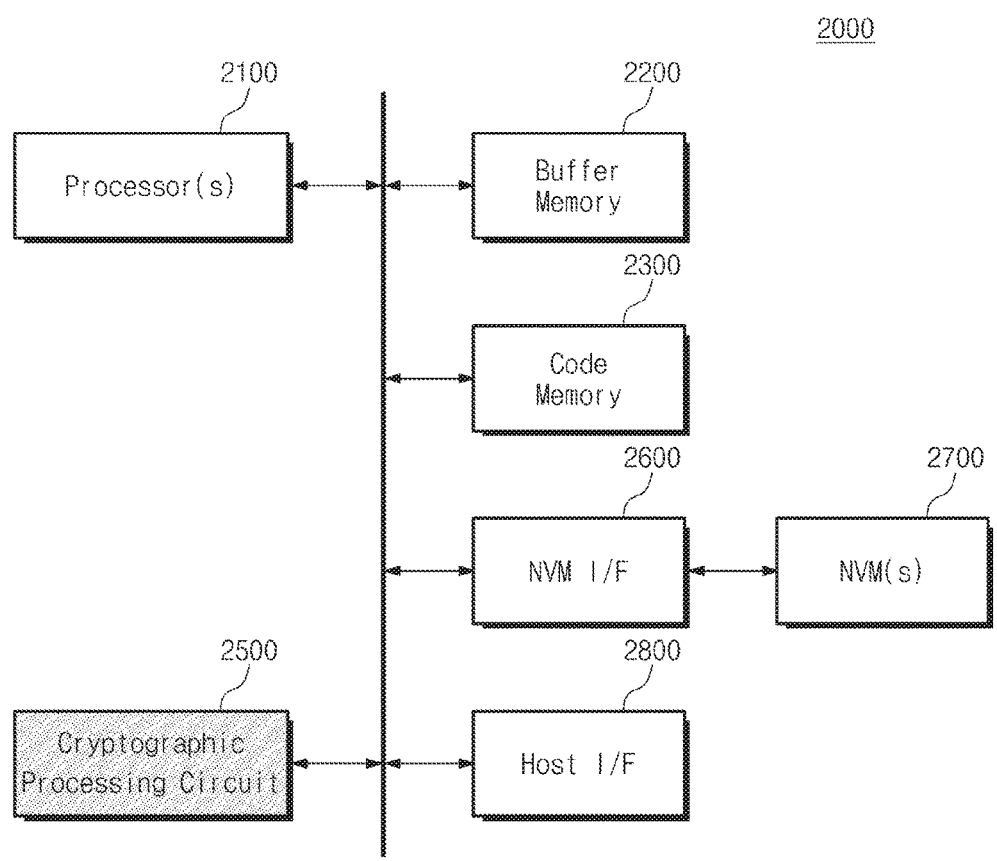
FIG. 23 is a block diagram illustrating an electronic device according to at least one example embodiment of the inventive concepts.

FIG. 23 is a block diagram illustrating an electronic device 2000 according to at least one example embodiment of the inventive concepts. Referring to FIG. 23, an electronic device 2000 may include at least one processor 2100, a buffer memory 2200, a code memory 2300, a cryptographic processing circuit 2500, a nonvolatile memory interface 2600, a nonvolatile memory device 2700, and a host interface 2800. The electronic device 2000 may be one of the following devices or a combination of two or more thereof: a data storage medium (e.g., a solid state drive (SSD), a memory stick, a universal flash storage (UFS) device), a memory card (e.g., a secure digital (SD), a multimedia card (MMC), an embedded MMC (eMMC), or the like), a smart card, a mobile device (e.g., a smartphone and Galaxy™ series), a smartphone, a tablet personal computer (PC), a mobile phone, a video phone, an e-book reader, a desktop PC, a laptop PC, a netbook computer, a personal digital assistant (PDA), a portable multimedia player (PMP), a MP3 player, a mobile medical device, an electronic bracelet, an electronic necklace, an electronic appcessory, a camera, a wearable device, an electronic clock, a wrist watch, a home appliance (e.g., a refrigerator, an air conditioner, a vacuum cleaner, an oven, a microwave oven, a washing machine, an air cleaner, or the like), an artificial intelligence robot, a television (TV), a digital video disk (DVD) player, an audio system, various kinds of medical devices (e.g., a magnetic resonance angiography (MRA) camera, a magnetic resonance imaging (MRI) camera, a computed tomography (CT) camera, a ultrasonic machine, or the like), a navigation device, a global positioning system (GPS) receiver, an event data recorder (EDR), a flight data recorder (FDR), a set-top box, a TV box (e.g., Samsung HomeSync™, Apple TV™, or Google TV™), an electronic dictionary, a car infotainment device, an electronic equipment for ship (e.g., a navigation system for ship, a gyrocompass, or the like), an avionics system, a security device, electronic clothes, an electronic key, a camcorder, a game console, a head-mounted display (HMD), a flat panel display device, an electronic picture frame, an electronic album, furniture or a portion of a building or a structure, which is includes a communication function, an electronic board, an electronic signature receiving device, or a projector.

The at least one processor 2100 may be implemented to control an overall operation about the electronic device 2000. Here, the at least one processor 2100 may be a central processing unit, an application processor, a graphic processor, or the like. In at least one example embodiment, the at least one processor 2100 may include a secure processor or a secure element (SE), and the like. For example, the at least one processor 2100 may have a tamper-resistant function to be protected from a tempering attack such as a microprobing, a software attack, an eavesdropping, a fault generation, or the like.

The buffer memory 2200 may operate according to control of the at least one processor 2100. For example, the buffer memory 2200 may temporarily store data which is processed by the at least one processor 2100, or may buffer data which is transmitted to the nonvolatile memory device 2700 or data which is read from the nonvolatile memory device 2700. In at least one example embodiment, the buffer memory 2200 may be a random-access memory (RAM), a static random-access memory (SRAM), and a phase-change random-access memory (PRAM).

The code memory 2300 may be implemented to store a code and/or an application for managing or operating the electronic device 2000. In at least one example embodiment, the code memory 2300 may be a read-only memory (ROM) or a PRAM.

The cryptographic processing circuit 2500 may be implemented to perform an encryption/decryption operation with respect to input/output data. As described in FIGS. 1 to 22, the cryptographic processing circuit 2500 may be implemented to be performed in one of a normal mode and an acceleration mode when an encryption/decryption operation is performed. In a normal mode, an encryption/decryption may be sequentially performed with respect to block data, and in an acceleration mode, an encryption/decryption operation may be randomly performed with respect to block data. Meanwhile, the cryptographic processing circuit 2500 illustrated in FIG. 23 may exist outside, but not limited to, the at least one processor 2100. The cryptographic processing circuit 2500 may be implemented to exist in the at least one processor 2100.

Data exchange with the nonvolatile memory device 2700 may be performed through the nonvolatile memory interface 2600. The host interface 2800 may be connected to an external host through a parallel advanced technology attachment (PATA) bus, a serial advanced technology attachment (SATA) bus, a small computer system interface (SCSI), a universal serial bus (USB), a Peripheral Component Interconnect Express (PCIe), a SD, a serial attached SCSI (SAS), a UFS, an eMMC, an MMC, a NAND interface, or the like.

Although not illustrated in FIG. 23, the electronic device 2000 may further include an error correction code (ECC) circuit (e.g., hardware, software). The ECC circuit may generate an ECC for correcting a fail bit or an error bit of data received from the nonvolatile memory device 2700 and may generate data with a parity bit by performing an error correction encoding with respect to the data provided to the nonvolatile memory device 2700. The parity bit may be stored in the nonvolatile memory device 2700. Moreover, The ECC circuit may perform an error correction decoding with respect to data outputted from the nonvolatile memory device 2700. The ECC circuit may correct an error using the parity bit. The ECC circuit may correct an error using a coded modulation such as a low density parity check (LDPC) code; a Bose, Chaudhuri, Hocquenghem (BCH) code; a turbo code; a Reed-Solomon code; a convolution code; a recursive systematic code (RSC); a trellis-coded modulation (TCM); a block coded modulation (BCM); or the like.

Although not illustrated, the electronic device 2000 may mount a wireless communication function (e.g., WiFi). Meanwhile, the electronic device 2000 may further include components that are not illustrated in FIG. 23, or may not include at least one (except a cryptographic processing circuit) of components illustrated in FIG. 23.

At least one example embodiment of the inventive concepts may be applied to an SSD.

Figure 24:
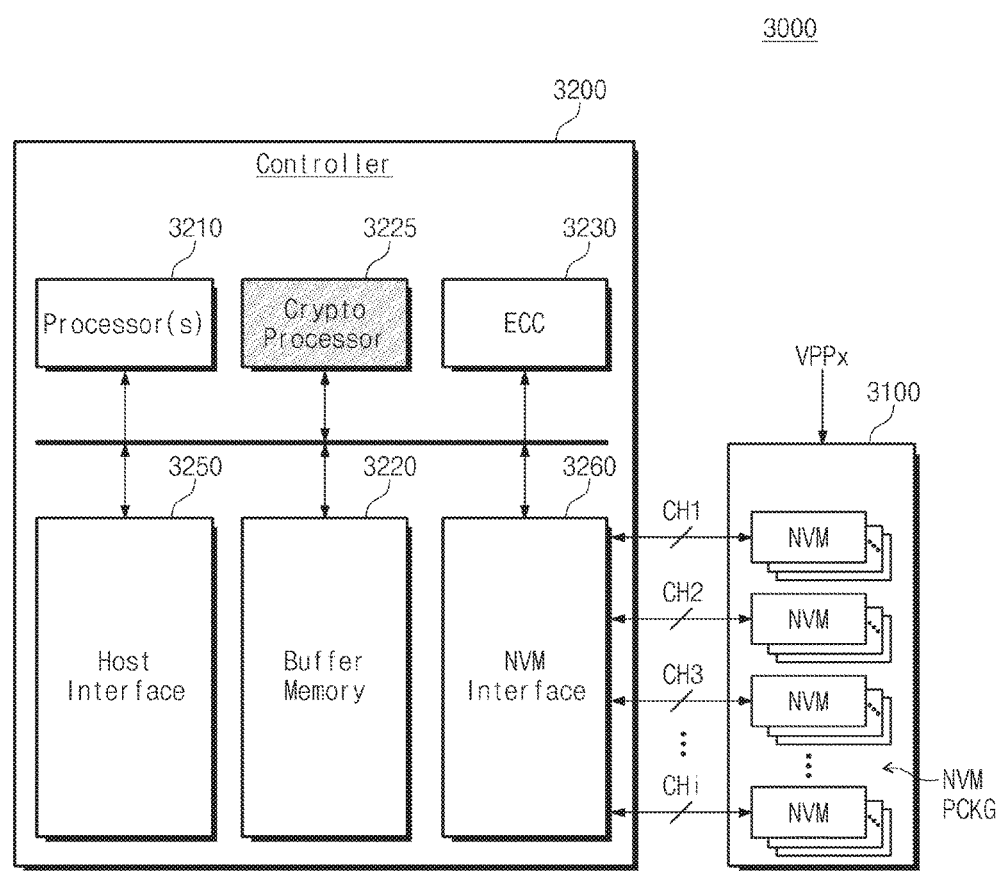
FIG. 24 is a block diagram illustrating an SSD according to at least one example embodiment of the inventive concepts.

FIG. 24 is a block diagram illustrating an SSD according to at least one example embodiment of the inventive concepts. Referring to FIG. 24, a SSD 3000 may include a plurality of nonvolatile memory devices 3100 and a SSD controller 3200.

The nonvolatile memory devices 3100 may be implemented to optionally receive an external high-voltage Vppx. The nonvolatile memory devices 3100 may include a plurality of nonvolatile memory packages NVM PCKG connected to a plurality of channels CH1 to CHi (e.g., 'i' is an integer of two or more), respectively.

The SSD controller 3200 may be connected to the nonvolatile memory devices 3100 through the channels CH1 to CHi, respectively. The SSD controller 3200 may include at least one processor 3210, a buffer memory 3220, a crypto processor 3225, an error correction code (ECC) circuit 3230 (e.g., hardware, software), a host interface 3250, and a nonvolatile memory interface 3260.

The buffer memory 3220 may temporarily store data used in an operation of the SSD controller 3200. The buffer memory 3220 may include a plurality of memory lines for storing data or a command. Here, the memory lines may be mapped to cache lines using various methods. In FIG. 24, the buffer memory may be arranged in, but not limited to, the SSD controller 3200. A buffer memory according to at least one example embodiment of the inventive concepts may be located outside the SSD controller 3200 as a separate intellectual property (IP).

The crypto processor 3225 may be implemented with one of the crypto devices 100 to 500 illustrated in FIGS. 15 to 19 or may be implemented with an encryption/decryption operation described in FIGS. 1 to 22.

The ECC circuit 3230 may calculate a value of an error correction code about data to be programmed at a write operation, may correct data which was read at a read operation based on the value of the error correction code, and may correct an error about data recovered from the nonvolatile memory devices 3100 at a data recovery operation. For example, the ECC circuit 3230 may detect and correct an error by a sector. However, the inventive concepts are not limited to the error correction unit.

The ECC circuit 3230 may generate a fail bit in data received from the nonvolatile memory devices 3100 or an error correction code for correcting an error bit. The ECC circuit 3230 may perform an error correction encoding with respect to data provided to the nonvolatile memory devices 3100 and may generate data to which a parity bit is added. The parity bit may be stored in the nonvolatile memory devices 3100. Moreover, The ECC circuit 3230 may perform an error correction decoding with respect to data outputted from the nonvolatile memory device 3100. The ECC circuit 3230 may correct an error using a parity bit. Although not illustrated, a code memory for storing code data which is required to operate the SSD controller 3200 may be further included. The code memory may be implemented with a nonvolatile memory device.

The host interface 3250 may provide an interface function for interfacing with an external device. The host interface 3250 may be connected to the external host through a PATA bus, a SATA bus, a SCSI, a USB, a PCIe, a SD, a SAS, a UFS, an eMMC, an MMC, a NAND interface, or the like. The nonvolatile memory interface 3260 may provide an interface with the nonvolatile memory devices 3100. Although not illustrated, the SSD controller 3200 may mount a wireless communication function (e.g., WiFi).

An SSD 3000 according to at least one example embodiment of the inventive concepts may start in an acceleration mode to perform an encryption operation at a random position.

Figure 25:
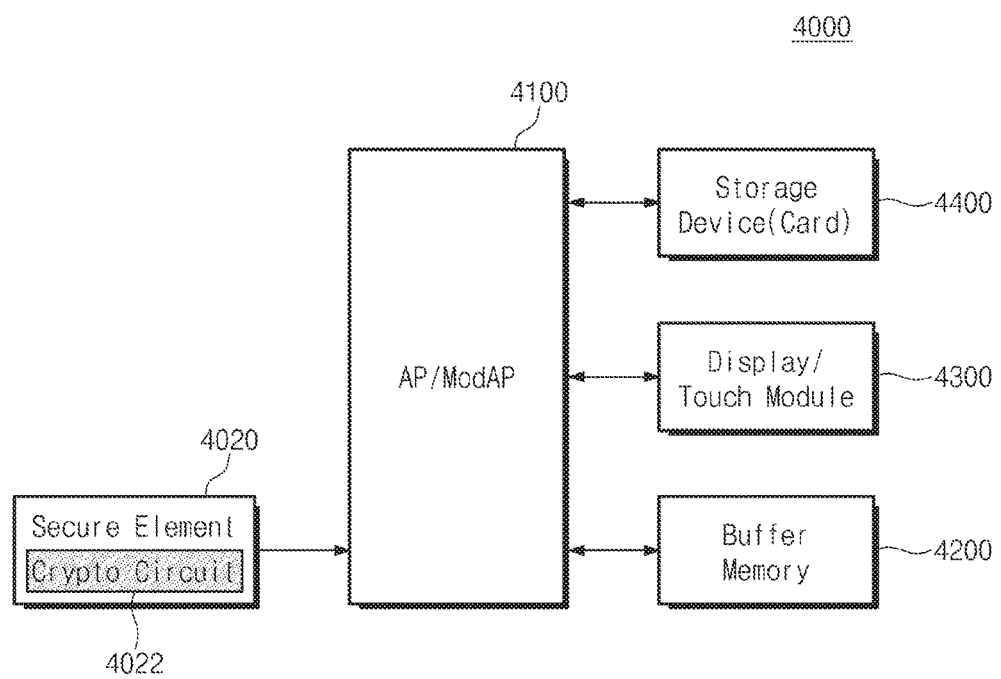
FIG. 25 is a block diagram illustrating a mobile device according to at least one example embodiment of the inventive concepts.

FIG. 25 is a block diagram illustrating a mobile device 4000 according to at least one example embodiment of the inventive concepts. Referring to FIG. 25, a mobile device 4000 may include a secure element 4020, a processor 4100, a buffer memory 4200, a display/touch module 4300, and a storage device 4400.

The secure element 4020 may be implemented to provide an overall secure function of the mobile device 4000. The secure element 4020 may be implemented with software and/or tamper resistant hardware, may permit a high-level of security, and may work with a trusted execution environment (TEE) of the processor 4100. The secure element 4020 may include a Native operating system (OS), a security storage device which is an internal data storage unit, an access control block which control right of access to the secure element 4020, a security function block for performing ownership management, key management, digital signature, encryption/decryption, and the like, and a firmware update block for updating firmware of the secure element 4020. For example, the secure element 4020 may be a universal IC card (UICC) (e.g., a universal subscriber identity module (USIM), a Code-Division Multiple Access (CDMA) subscriber identity module (CSIM), and an IP multimedia subscriber identity module (ISIM)), a subscriber identity module (SIM) card, an embedded secure elements (eSE), a MicroSD, Stickers, and the like.

Moreover, the secure element 4020 according to at least one example embodiment of the inventive concepts may include a crypto circuit 4022 (e.g., hardware, software). Here, the crypto circuit may be implemented with one of the crypto devices 100 to 500 illustrated in FIGS. 15 to 19 or may be implemented with an encryption/decryption operation described in FIGS. 1 to 22. In FIG. 25, the crypto circuit 4022 may be illustrated to exist outside the processor 4100. However, the inventive concepts may not be limited to position of the crypto circuit 4022. The crypto circuit 4022 according to at least one example embodiment of the inventive concepts may exist in the processor 4100.

The processor 4100 may be implemented to control an overall operation of the mobile device 4000 and a wired/wireless communication with an external device. For example, the processor 4100 may be an application processor (AP), an integrated modem application processor (hereinafter, referred to as "ModAP"), or the like.

The buffer memory 4200 may be implemented to temporarily store data, which is needed at an operation of the mobile device 4000. The display/touch module 4300 may be implemented to display data processed by the processor 4100 or to receive data from a touch panel. The storage device 4400 may be implemented to store data of a user. The storage device 4400 may be eMMC, SSD, UFS, or the like.

A crypto device according to at least one example embodiment of the inventive concepts make it possible to randomly access to block data by a block in an XTS mode and to process block data in parallel. An encryption/decryption operation may be promptly performed by immediately calculating a tweak value after a specific length in XTS mode. An encryption/decryption operation may be immediately performed with respect to block data corresponding to a random position. In at least one example embodiment, a tweak value may be updated by one clock cycle after a specific length in XTS mode. In at least one example embodiment, even though block data is bypassed in an encryption/decryption operation, corresponding tweak values may be continually updated.

A crypto device according to at least one example embodiment of the inventive concepts may select block data which is located at a random position and may encrypt the selected block data.

In at least one example embodiment, tweak values may be updated point in time when block data is inputted to a plurality of crypto cores and an encryption/decryption operation starts and point in time when a last round of each of the crypto cores is performed.

In at least one example embodiment, a crypto device including a plurality of crypto cores may perform a multiplication operation using positions, which corresponds to a multiplication operation value, of which the number is smaller than the number of the crypto cores.

According to at least one example embodiment of the inventive concepts, a crypto device, a storage device having the same and an encryption/decryption method thereof may immediately encrypt/decrypt block data, which is located at a random position, in a sector. Accordingly, at least one example embodiment of the inventive concepts may reduce a time about an encryption/decryption and may reduce power consumption by the reduced encryption/decryption time.

Furthermore, the crypto device, the storage device having the same, and the encryption/decryption method thereof may reduce a chip size by sharing a storage unit, compared with a conventional those.

Algorithms for implementation or control of the crypto devices, storage devices, encryptions methods, and/or decryption methods discussed in this application may be used for implementation or control of more general purpose apparatuses (e.g., processors) and/or methods of controlling apparatuses (e.g., processors).

Methods for implementation or control of the crypto devices, storage devices, encryptions methods, and/or decryption methods discussed in this application may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element (e.g., processor) to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components (e.g., circuits), such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processes.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element (e.g., processors) of the above-described embodiments, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

Although some example embodiments have been shown and described, it would be appreciated by those skilled in the art that changes may be made in these example embodiments without departing from the principles and spirit of the example embodiments, the scope of which is defined in the claims and their equivalents. For example, while certain operations have been described as being performed by a given element, those skilled in the art will appreciate that the operations may be divided between elements in various manners.

Although some example embodiments are described above with relation to crypto devices, storage devices, encryptions methods, and/or decryption methods, those skilled in the art will appreciate that some example embodiments may be applied to other types of systems, such as systems not used in the cryptography field (e.g., algorithms, combinatorics, finite fields, pseudorandom numbers), or more general purpose control systems (e.g., game theory, information theory, machine learning, number theory). Those skilled in the art will appreciate that the crypto devices, storage devices, encryptions methods, and/or decryption methods described in this application have a myriad of practical uses.

Although some example embodiments of the present disclosure have been shown and described, it would be appreciated by those skilled in the art that changes may be made in these example embodiments without departing from the principles and spirit of the invention, the scope of which is defined in the claims and their equivalents.

Therefore, it should be understood that the above embodiments are not limiting, but illustrative. While the inventive concepts have been described with reference to example embodiments, it will be apparent to those skilled in the art that various changes and modifications may be made without departing from the spirit and scope of the inventive concepts.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A method for encryption or decryption of data in a crypto device having at least one crypto core, the method comprising:

determining whether an operating mode of the crypto device is (i) a normal mode in which first to n-th encryptions with respect to first to n-th block data of a sector are sequentially performed or first to n-th decryptions with respect to the first to n-th block data of the sector are sequentially performed, or (ii) an acceleration mode in which k-th encryption with respect to k-th block data of the sector is immediately performed or k-th decryption with respect to the k-th block data of the sector is immediately performed, n being an integer, and k being greater than or equal to 2 and less than n; and in response to determining that the operating mode of the crypto device is the acceleration mode, generating a k-th tweak value corresponding to the k-th block data, by at least one multiplication operation including an exclusive-OR (XOR) operation and a shift operation, without performing the first to (k−1)-th encryptions or the first to (k−1)-th decryptions; and immediately performing the k-th encryption or the k-th decryption with respect to the k-th block data using the k-th tweak value.

2. The method of claim 1, wherein the generating of the k-th tweak value comprises:

performing the at least one multiplication operation in which a primitive element is multiplied by an encrypted initial tweak value.

3. The method of claim 2, further comprising:

generating the encrypted initial tweak value by encrypting an initial tweak value.

4. The method of claim 3, wherein the encrypting of the initial tweak value comprises:

repeatedly updating the at least one multiplication operation by a serial number corresponding to a position of the k-th block data.

5. The method of claim 4, wherein a number of cycles which are required to update the at least one multiplication operation is smaller than a number of cycles which are required to perform an encryption or a decryption with respect to one block data of the first to n-th block data.

6. The method of claim 1, wherein the at least one crypto core includes a plurality of crypto cores, and the k-th encryption or the k-th decryption is performed in each of the plurality of crypto cores.

7. The method of claim 1, further comprising:

sequentially generating (k+1)-th to n-th tweak values corresponding to (k+1)-th to n-th block data; and sequentially performing (k+1)-th to n-th encryptions or (k+1)-th decryptions with respect to the (k+1)-th to n-th block data in the at least one crypto core.

8. The method of claim 7, wherein the performing of the (k+1)-th to n-th encryptions or the (k+1)-th to n-th decryptions comprises sequentially receiving the (k+1)-th to n-th tweak values which are required to perform the (k+1)-th to n-th encryptions or the (k+1)-th to n-th decryptions in the at least one crypto core.

9. The method of claim 6, further comprising:

sequentially generating (k+1)-th to n-th tweak values corresponding to (k+1)-th to n-th block data; and sequentially performing (k+1)-th to n-th encryptions or (k+1)-th to n-th decryptions with respect to the (k+1)-th to n-th block data in each of the plurality of crypto cores.

10. The method of claim 1, further comprising:

sequentially generating (k+1)-th to n-th tweak values which are required in (k+1)-th to n-th encryptions or (k+1)-th to n-th decryptions from the k-th tweak value; and storing the k-th to n-th tweak values.

11. A method for encryption or decryption of data in a crypto device having a plurality of crypto cores, the method comprising:

determining whether an operating mode of the crypto device is (i) a normal mode in which first to n-th encryptions with respect to first to n-th block data of a sector are sequentially performed or first to n-th decryptions with respect to the first to n-th block data of the sector are sequentially performed, or (ii) an acceleration mode in which k-th encryption with respect to k-th block data of the sector is immediately performed or k-th decryption with respect to the k-th block data of the sector is immediately performed, n being an integer, and k being greater than or equal to 2 and less than n; and in response to determining that the operating mode of the crypto device is the acceleration mode, performing an initial operation to encrypt an initial tweak value;

performing at least one multiplication operation using the encrypted initial tweak value and a primitive element to generate k-th to n-th tweak values corresponding to the k-th to n-th block data without performing the first to (k−1)-th encryptions or the first to (k−1)-th decryptions; and sequentially performing the k-th to n-th encryptions or the k-th to n-th decryptions with respect to the k-th to n-th block data using the k-th to n-th tweak values in each of the plurality of crypto cores.

12. The method of claim 11, wherein when the operating mode is the acceleration mode, the k-th to n-th encryptions or the k-th to n-th decryptions are simultaneously performed in the plurality of crypto cores.

13. The method of claim 11, wherein when the operating mode is the acceleration mode, the k-th to n-th encryptions or the k-th to n-th decryptions are sequentially performed in the plurality of crypto cores.

14. The method of claim 13, further comprising:

sequentially receiving the k-th to n-th tweak values, which are required in the k-th to n-th encryptions or the k-th to n-th decryptions, from the plurality of crypto cores.

15. The method of claim 11, further comprising:

receiving information about a position of the k-th block data.

16. The method of claim 11, further comprising:

determining whether to bypass an encryption or a decryption with respect to the sector, wherein the crypto device performs an encryption or a decryption with respect to a next sector.

17. The method of claim 16, wherein the determining of whether to bypass the encryption or the decryption comprises deciding whether an error exists in the sector.

* * * * *